US008041701B2

(12) United States Patent
Amato et al.

(10) Patent No.: US 8,041,701 B2
(45) Date of Patent: Oct. 18, 2011

(54) ENHANCED GRAPHICAL INTERFACES FOR DISPLAYING VISUAL DATA

(75) Inventors: Jerry S. Amato, Brooklyn, NY (US); Nicolas Brun, Brooklyn, NY (US); Ales Holecek, Kirkland, WA (US); Costa Bassem Touma, Santa Clara, CA (US)

(73) Assignee: DG FastChannel, Inc, Irving, TX (US)

( * ) Notice: Subject to any disclaimer, the term of this patent is extended or adjusted under 35 U.S.C. 154(b) by 177 days.

(21) Appl. No.: 11/329,923

(22) Filed: Jan. 10, 2006

(65) Prior Publication Data

US 2006/0265417 A1 Nov. 23, 2006

(51) Int. Cl.
*G06G 7/00* (2006.01)
(52) U.S. Cl. ........................................................ 707/707
(58) Field of Classification Search .............. 707/3, 756, 707/707; 715/744, 781
See application file for complete search history.

(56) References Cited

U.S. PATENT DOCUMENTS

| | | | | |
|---|---|---|---|---|
| 5,845,084 | A * | 12/1998 | Cordell et al. | 709/234 |
| 6,112,197 | A * | 8/2000 | Chatterjee et al. | 707/3 |
| 6,353,448 | B1 * | 3/2002 | Scarborough et al. | 715/744 |
| 6,667,751 | B1 * | 12/2003 | Wynn et al. | 715/833 |
| 6,747,674 | B1 * | 6/2004 | Asami | 715/721 |
| 6,864,904 | B1 | 3/2005 | Ran et al. | |
| 6,931,600 | B1 * | 8/2005 | Pittman | 715/767 |
| 7,177,948 | B1 * | 2/2007 | Kraft et al. | 709/246 |
| 7,337,396 | B2 * | 2/2008 | Rosenholtz et al. | 715/273 |
| 2004/0143667 | A1 * | 7/2004 | Jerome | 709/228 |
| 2004/0205628 | A1 * | 10/2004 | Rosenholtz et al. | 715/526 |
| 2006/0224997 | A1 * | 10/2006 | Wong et al. | 715/838 |
| 2006/0294476 | A1 * | 12/2006 | Buckley | 715/781 |

OTHER PUBLICATIONS

M. Beigi, MetaSEEk: A Content-Based Meta-Search Engine for Images, Jan. 1998.*
E. Selberg, The MetaCrawler Architecture for Resource Aggregation on the Web, Nov. 1996.*
E. Selberg, Multi-Service Search and Comparision Using the MetaCrawler, Oct. 1995.*
Girafa, Girafa.com, Apr. 2003.*

* cited by examiner

*Primary Examiner* — Tim T Vo
*Assistant Examiner* — Gary Koo
(74) *Attorney, Agent, or Firm* — Kenyon & Kenyon LLP

(57) ABSTRACT

Techniques and implementations for providing enhanced functionality for handling data in Internet browsers or other applications used for accessing data over a network, including providing thumbnail image displays of the current appearance of webpages referenced by URLs returned in a set of search results, providing thumbnail image displays of the webpages referenced by a list of favorite or bookmarked websites, providing thumbnail image displays of webpages which have been blocked from appearing on a user's screen, and providing thumbnail image displays of images which have been extracted from webpages and stored for potential future use.

24 Claims, 23 Drawing Sheets

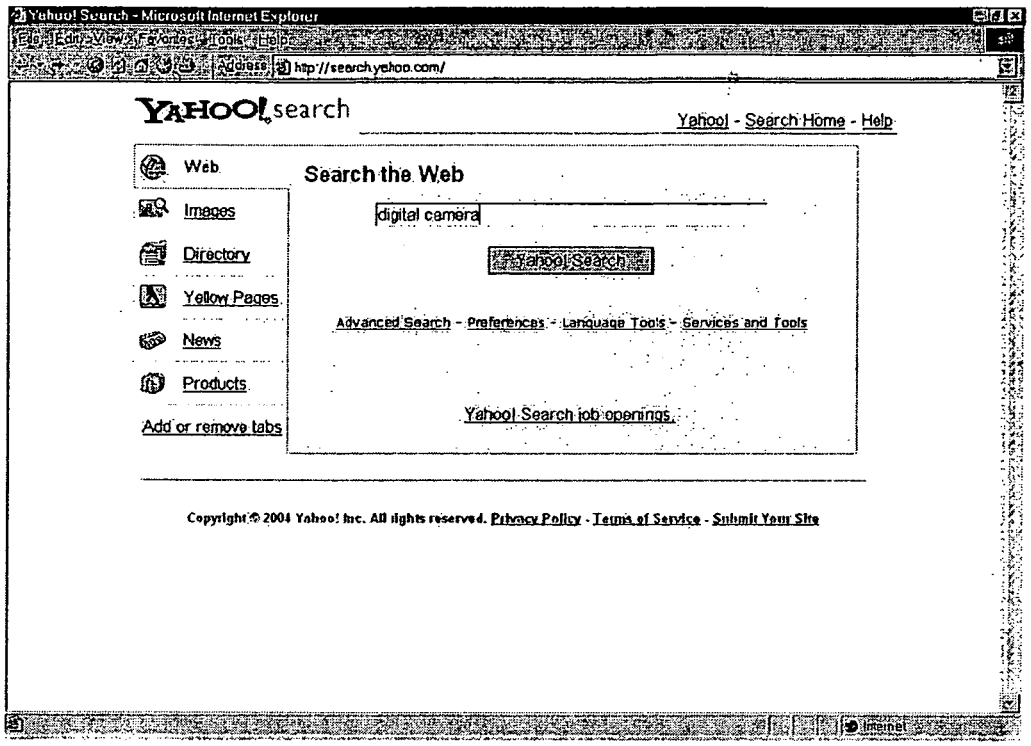
Fig. 1A – PRIOR ART
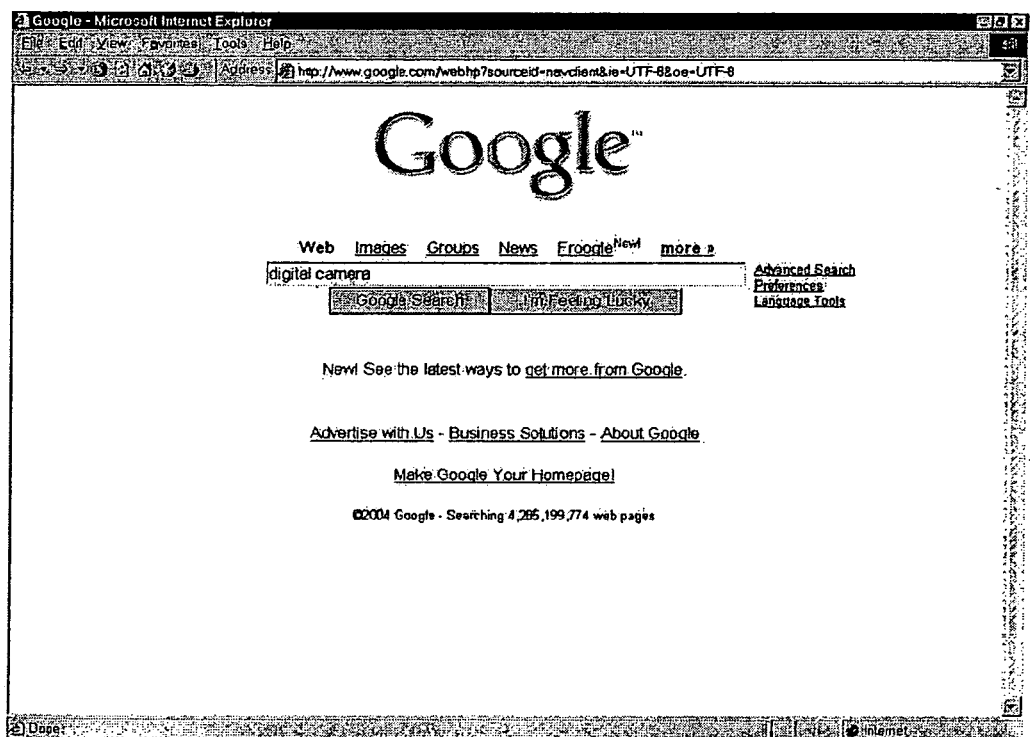
Fig. 1B – PRIOR ART

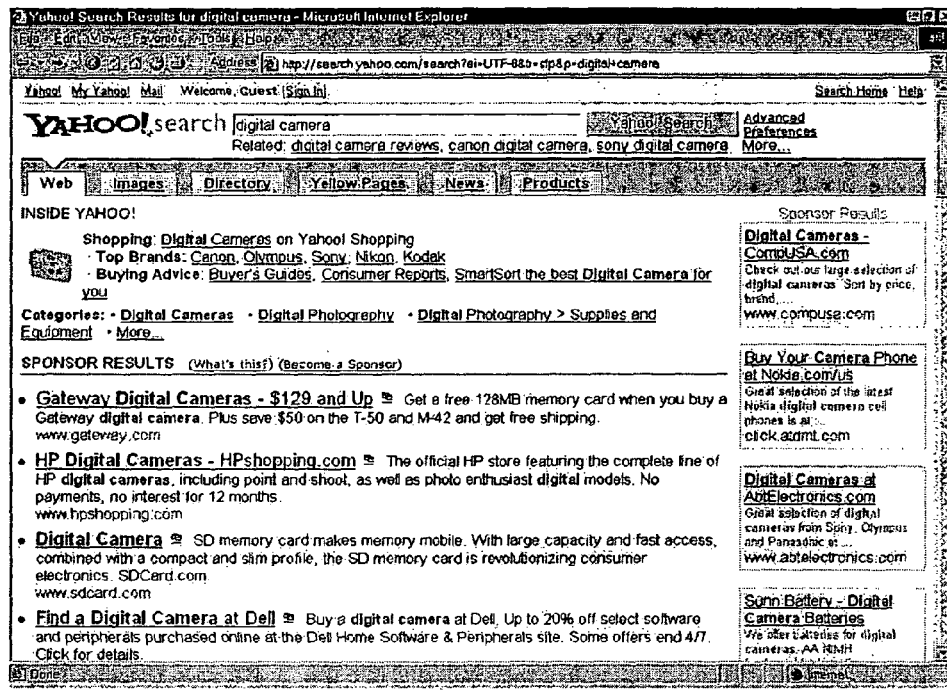
Fig. 1C – PRIOR ART
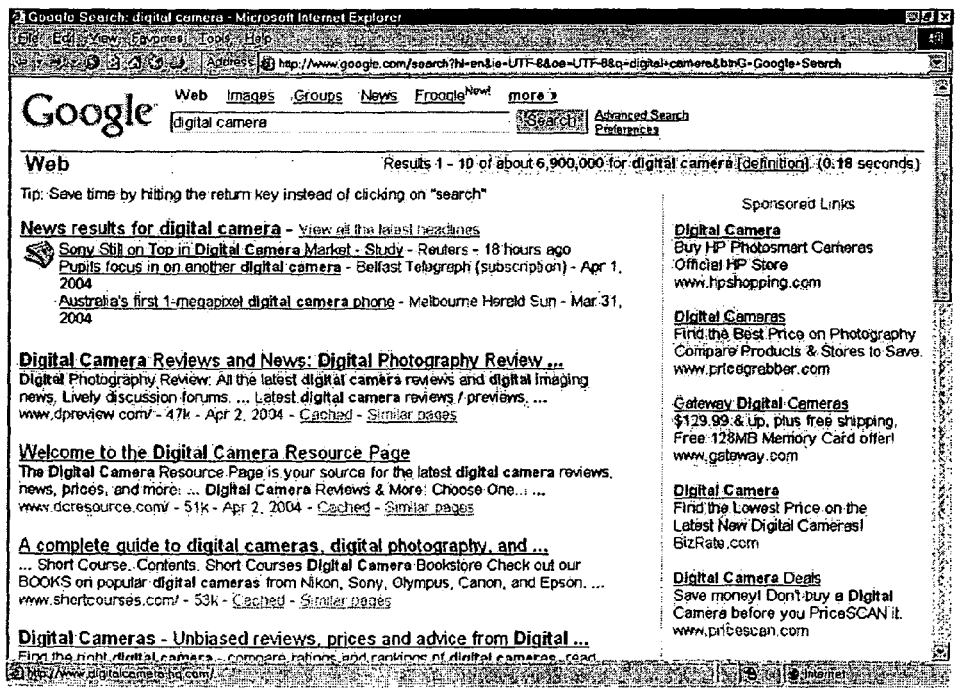
Fig. 1D – PRIOR ART

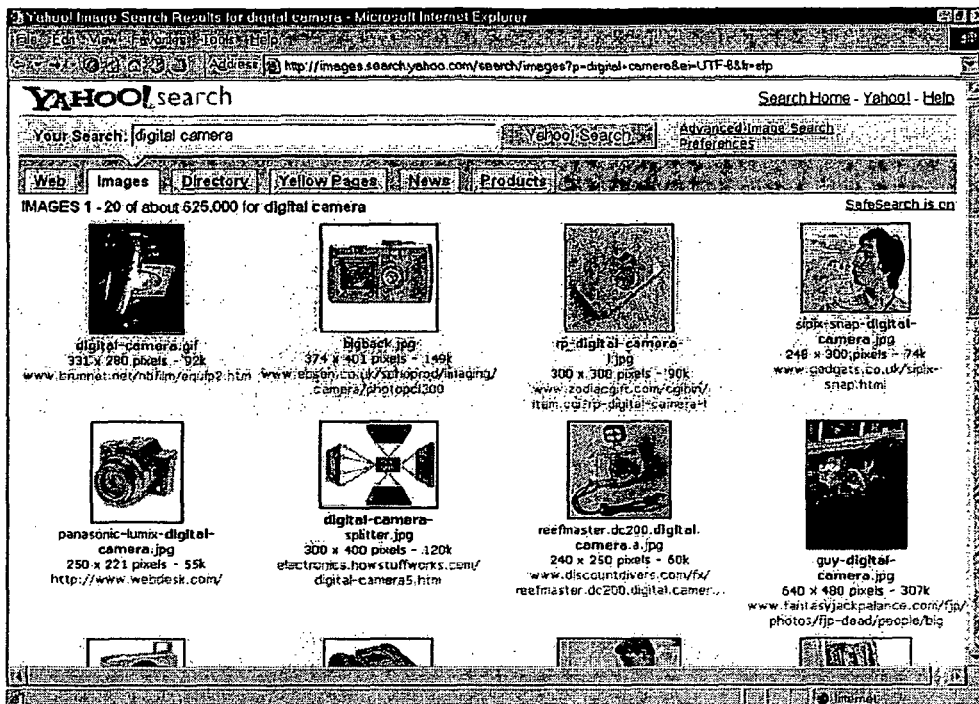
Fig. 1E – PRIOR ART
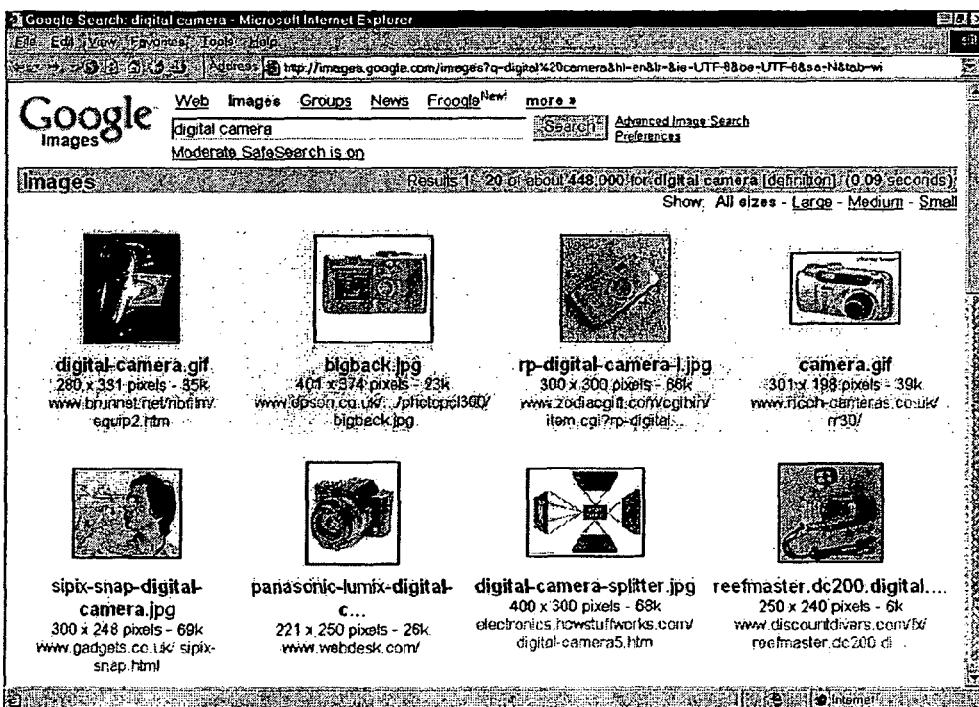
Fig. 1F – PRIOR ART

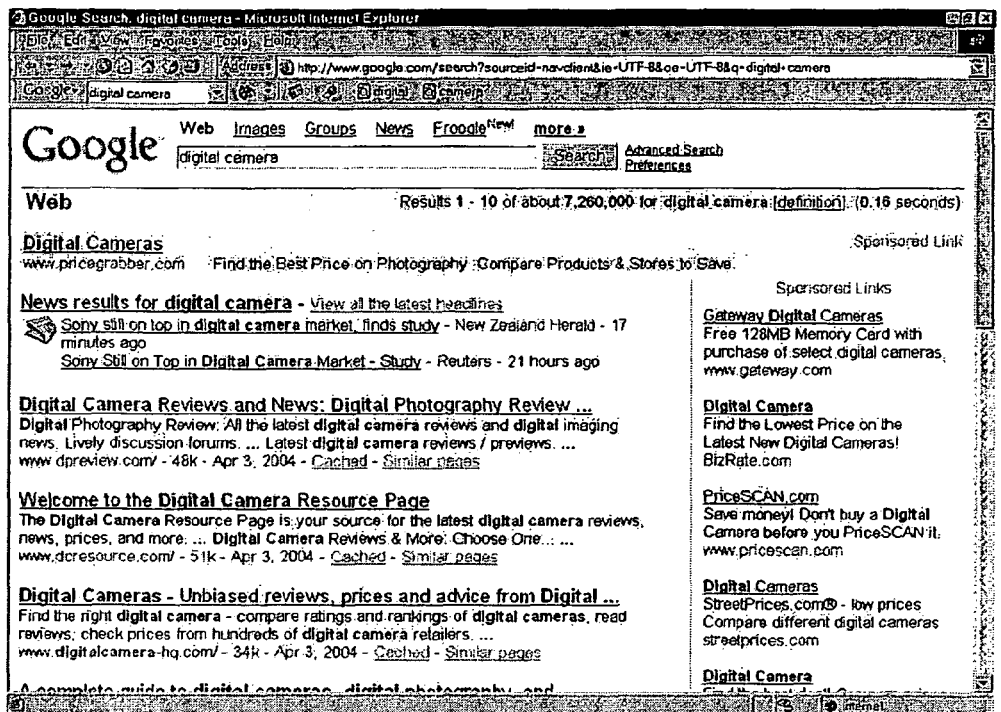
Fig. 1G – PRIOR ART
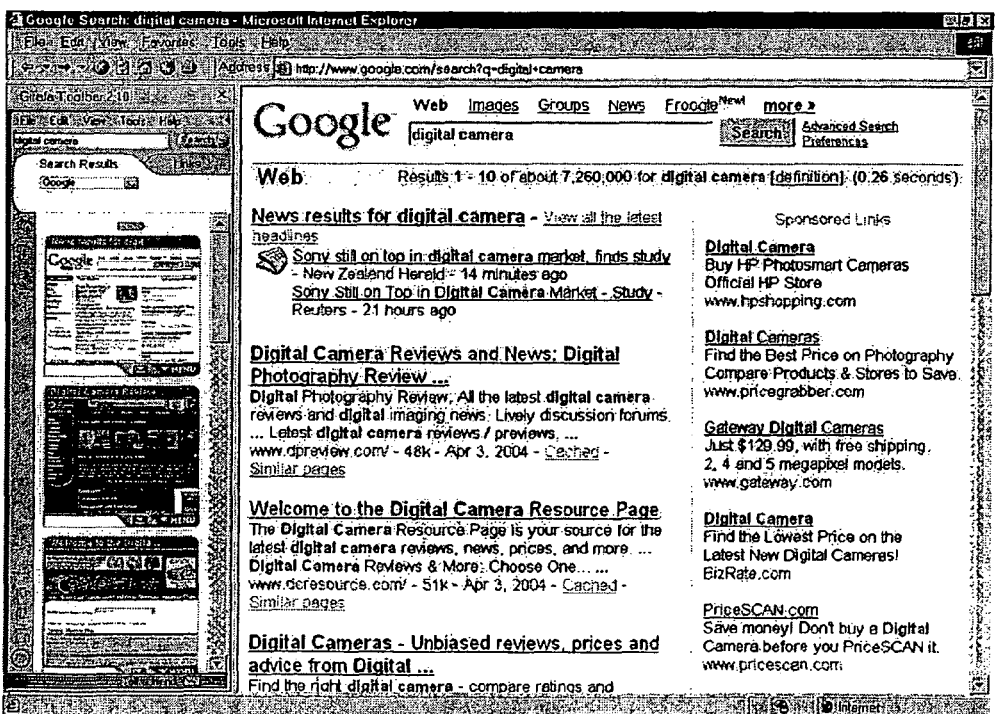
Fig 1H – PRIOR ART

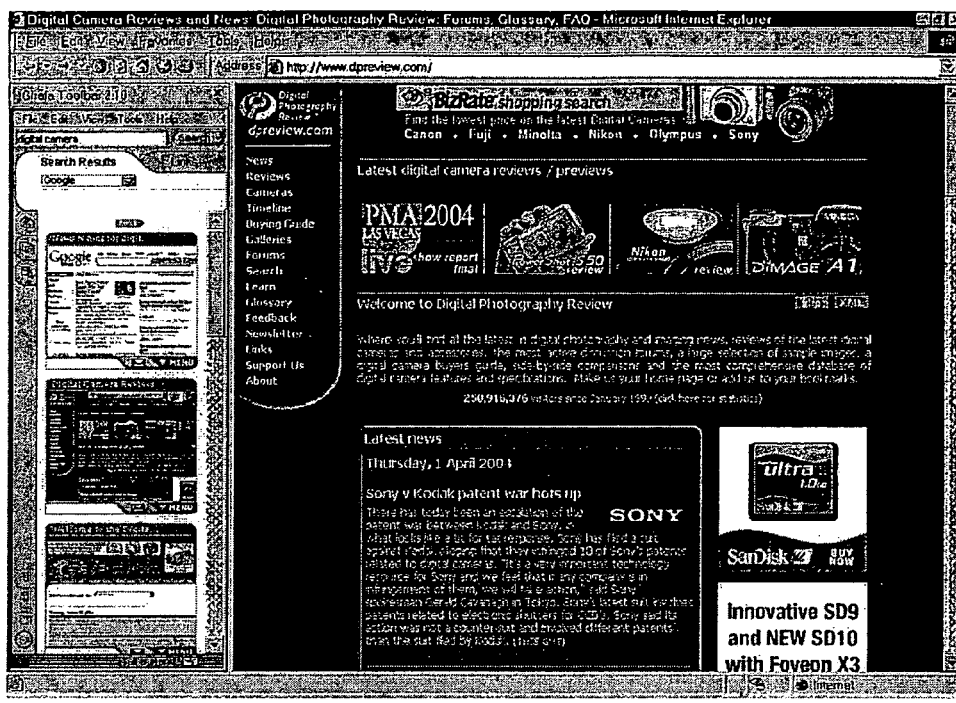
Fig. 1I – PRIOR ART

ENHANCED GRAPHICAL INTERFACES FOR DISPLAYING VISUAL DATA

CROSS-REFERENCE TO RELATED APPLICATION

This application claims the benefit of, and hereby incorporates by reference in its entirety, U.S. Provisional Application No. 60/568,550, entitled "Enhanced Graphical Interfaces For Displaying Visual Data", filed May 4, 2004.

FIELD OF THE INVENTION

The present invention is directed to a variety of techniques and implementations for providing enhanced functionality for handling data in Internet browsers or other applications used for accessing data over a network.

BACKGROUND

The continued growth and popularity of the Internet and World Wide Web has resulted in the availability of a vast amount of information to users. This has lead to an ever increasing demand from users for ways to easily search for, identify and retain the particular information in which they are interested without being overwhelmed by data, both solicited and unsolicited, that the user is not interested in. Typically, a user looking for information on a particular subject will navigate their Internet browser to a webpage for a search engine such as those offered by Yahoo!® or Google®. At the webpage, the user enters a search query (e.g., keywords or other text related to the subject in which they are interested) into a text box on the webpage (see FIGS. 1A and 1B) and that search query is sent by their browser to the server for the search engine. The search engine server performs the search and sends a webpage containing the results back to the user's browser. These results typically include a listing of hyperlinks for the webpages produced by the search and possibly additional information such as an excerpt of the text on the page which relates to the keywords entered by the user for the search (see FIGS. 1C and 1D). The search engine may also provide the option of conducting a search for images that relate to the user's search query. When such a search is conducted, the search engine server sends the user's browser a webpage which includes a display of the images resulting from the search and hyperlinks to the webpages that the images are from (see FIGS. 1E and 1F).

Frequently, in order to support the operation of the search engine, the search results also include "sponsored links," which are typically hyperlinks to advertisers' webpages for products or services related to the search results. For example, a link to an advertiser's webpage may be displayed in conjunction with searches conducted on certain subjects or keywords chosen by the advertiser. The search engine provider is typically compensated by the advertiser when a user clicks on the advertiser's sponsored link to be directed to the advertiser's webpage. These sponsored links are typically "redirect links" which when clicked on, rather than directly sending the user to the advertiser's webpage, send a message from the user's browser back to the search engine server indicating that the redirect link has been clicked on by the user. The search engine server logs that the sponsored link has been clicked on (so that the advertiser can be billed for the "click-thru") and then sends a message back the user's browser, redirecting it to the advertiser's webpage.

Some search engines, such as Google®, and software companies, such as Microsoft®, have developed "toolbars" which are software programs that may be installed directly onto a user's computer to enable searching to be conducted without first navigating to the search engine's webpage. These toolbars generally operate with the user's browser and provide an additional toolbar at the top of the browser's application window which contains a text box for entering search queries and a number of buttons to provide the various search functions. When a user enters a search query and presses a "search" button, the toolbar sends the query to the search engine server which responds by sending back a webpage of search results just as if the user had entered a query through the search engine's webpage (see FIG. 1G).

Another search toolbar, by GIRAFA™, occupies a vertical area on the side of the browser space and operates with a variety of search engines. When a user submits a query, the webpage listing search results from the selected search engine is displayed in the main browser area and the GIRAFA™ search tool bar area displays a thumbnail image of the webpages of each of the search results. These thumbnail images are retrieved from a thumbnail index maintained on a GIRAFA™ server (see FIG. 1H). Apparently, the GIRAFA™ index of thumbnail images is periodically updated by "crawling" the web. GIRAFA™' s website provides an interface for individuals to submit URLs (Uniform Resource Locators) which GIRAFA™ will index and add to their central index of thumbnail images. As a result, when a user navigates to a webpage by clicking on the thumbnail image, the webpage may appear different than the thumbnail image because the thumbnail was taken at some indeterminate point in the past (see FIG. 1I).

Some search toolbars and browsers include a feature commonly referred to as a "pop-up blocker." "Pop-ups" are additional windows (frequently advertisements) that are opened on a user's computer screen (either on top of or beneath the current browser window) by code or instructions from the webpage that the user is currently viewing or has recently viewed. These pop-ups are usually not solicited by the user but are opened by a webpage to which the user has navigated for another purpose. A pop-up blocker prevents such windows from being opened on a user's screen without permission.

Currently, there are a number of drawbacks to the search toolbars presently in use. For example, while allowing a search to be launched from the toolbar area, the results of the search are shown as text in the webpage area, not in the toolbar. Also, the thumbnail screenshots presented by the Girafa toolbar may be misleading regarding the webpage's current appearance because the webpage may have been updated since Girafa last stored a thumbnail of it in its central index. Moreover, the actual web pages of the individual results are not loading on the user's computer; therefore slowing the process of reviewing the information available on those sites. Furthermore, although the pop-up blocker functionality of these toolbars may provide an audio or visual cue that a pop-up has been blocked (e.g., a beep or a flashing mouse cursor), the user cannot see what was actually blocked from appearing and cannot restore the blocked pop-up if the user realizes he did not want it blocked.

SUMMARY

The present invention provides systems and methods for enhancing the functionality of Internet browsers and other network applications, including the ability to display search results in the toolbar, to display a thumbnail image of the current appearance of each of the webpages in the search results, to display thumbnail images of blocked pop-up windows, or to allow images of the currently displayed webpage to be stored in the toolbar.

In one possible implementation of the present invention, a current thumbnail image of each webpage in a set of search results is displayed and the user may click on the thumbnail to access the webpage. For example, a search query is sent to a server by a program on a user's computer (e.g., a browser toolbar) implemented according to the present invention. When the toolbar receives the search results back from the server, the toolbar processes the search results to determine a URL for each of the webpages listed in the results. The toolbar may then retrieve the webpage for each of the URLs, open each webpage in the background (i.e., hidden from the user), take a screenshot of each webpage, and create a thumbnail image of each screenshot. The webpage may also be stored in a cache on the user's computer—enabling faster rendering when the user clicks on the corresponding hyperlink. These thumbnail images may then be displayed horizontally (e.g., left to right) in the toolbar area. The search results may also be displayed in typical text fashion in the main browser area. If the user selects a thumbnail, the browser may immediately display the corresponding webpage by accessing it in the user's cache or may navigate to the corresponding URL from the search results, while the search results may continue to be displayed in the toolbar.

Another possible implementation of the present invention is to provide a comparative set of search results from a second search engine when a user executes a search on a first search engine. For example, a user may navigate to the webpage of a first search engine and execute a search query. When the search engine selected by the user returns its search results, a program (e.g., a browser toolbar) implemented in accordance with the present invention may interpret the search results (using, for example, the URL of the webpage) to determine the terms that were searched on. The toolbar may then send these search terms to a second search engine. When the toolbar receives the search results back from the second search engine, it may process the search results to determine a URL for each of the webpages listed in the results, retrieve and open each of those webpages in the background, take screenshots, and create a thumbnail image of each screenshot. These thumbnail images from the second search engine's search results may then be displayed in the toolbar area for comparison by the user with the first search engine's search results displayed below as a webpage in the browser window.

Another possible implementation of the present invention is a method for displaying search results through images. Such a method may include receiving a set of search results, extracting information from the search results which identifies at least one network location, downloading data from that network location, creating an image from the downloaded data that depicts the current appearance of the network location; and displaying the image. Alternatively, such a method may include receiving, at a user's computer, a set of search results from a server, extracting the address of a webpage from the search results, opening, on the user's computer, the webpage at the address without displaying the webpage on a screen of the user's computer, creating a thumbnail image of the webpage, and displaying the thumbnail image of the webpage on the screen of the user's computer.

In another possible implementation of the present invention, a pop-up blocker may be implemented which displays thumbnail images of the blocked pop-ups and allows the user to restore a blocked pop-up if desired. For example, when a webpage attempts to open a pop-up, instead of allowing the pop-up to open on the user's screen or simply blocking the pop-up entirely, a pop-up blocker implemented according to the present invention may allow the pop-up to open in the background (i.e., hidden from the user), take a screenshot of the pop-up window, and create a thumbnail image of the screenshot. The thumbnail image may then be displayed in a "pop-up bin" in the browser's toolbar. After observing the thumbnail image of the pop-up, the user may click on the thumbnail image to allow the pop-up window to open on the screen, if desired.

In another possible implementation of the present invention, a user's individual list of website links (e.g., a "favorites" or "bookmarks" list) may be presented in the form of thumbnail images of screenshots of the chosen webpages. For example, a toolbar implemented in accordance with the present invention may process the user's list of website links by opening each webpage in the background (i.e., hidden from the user), taking a screenshot of each webpage, and creating a thumbnail image of each screenshot. These thumbnails may then be displayed in the toolbar area as "visual bookmarks" which allow the user to navigate to the chosen webpage by clicking on the thumbnail image.

In another possible implementation of the present invention, a toolbar may be implemented which allows a user to easily save images from the webpage currently displayed. For example, when a webpage including images is displayed in the browser of a user who has installed a toolbar implemented according to the present invention, the user may click-and-drag any of the images from the webpage onto the toolbar. The toolbar may then save the image to a location on the user's hard drive, create a thumbnail image, and display the thumbnail image in an area in the toolbar. The user may then retrieve the image for later use even after the browser's cache has been emptied.

BRIEF DESCRIPTION OF THE DRAWINGS

FIGS. 1A-1I show prior art search tool implementations.

DETAILED DESCRIPTION OF EXAMPLE EMBODIMENTS

The systems and methods of the present invention may be implemented in a variety of network-aware applications. These applications are typically Internet browsers such as Microsoft's Internet Explorer®, but may include any application which allows a user to receive data from a network or even a stand alone application which runs directly on the user's operating system. The network may include, for example, the Internet, a local area network, or a wireless network. The browser or other network-aware application may be installed or used on, for example, personal computers and network servers such as those made by Dell®, Hewlett-Packard® or Apple®, personal digital assistants such as those using the Palm® or Microsoft Windows CE® operating systems, mobile telephones that are capable of network data access such as those made by Motorola® or Qualcomm®, set top boxes for televisions that are capable of network data access, and game consoles equipped for network access such as the Microsoft Xbox® or Sony Playstation 2®.

Figure 2:
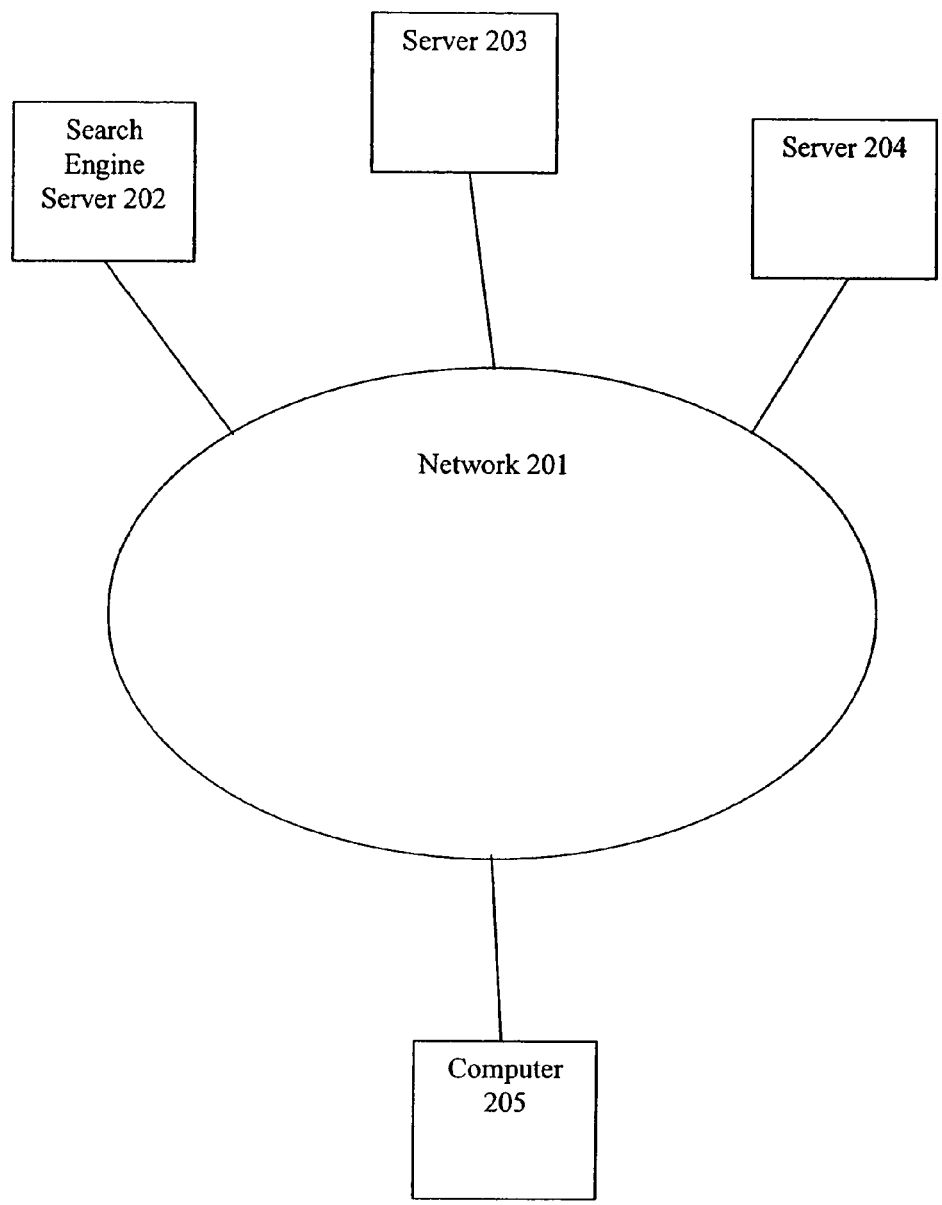
FIG. 2 illustrates one possible network architecture in which the present invention could be implemented.

An example of a network that could be used with the present invention is shown in FIG. 2. Network 201 is any conventional network for data transmission including, for example, Ethernet, token ring, or RF hardware using the TCP/IP, IPv6, HTTP, or WAP protocols. Servers 202, 203, and 204 are any conventional hardware and software platforms used for implementing network servers. These platforms may include, for example, Intel® or AMD® x86 processor based servers from Dell®, or Hewlett-Packard®, Motorola® processor based servers from Apple®, workstations from Sun® or IBM® and mainframes or minicomputers such as the IBM S/390®. The software running on these servers may include, for example, Microsoft Windows®, MacOS®, Red Hat Linux®, a commercial Unix variant such as AIX or Solaris, or any other network capable operating system. Server 202 is a search engine server running software which may provide search capabilities directed to searching the entire Internet or only an individual website. Servers 203 and 204 may be more traditional web or file servers running software such as Microsoft Internet Information Server or the Apache HTTP Server. Computer 205 is any general purpose home or office computer running an operating system such as Microsoft Windows XP®, MacOS®, or Linux and using a network application such as Netscape Navigator® or Microsoft Internet Explorer®.

Figure 3:
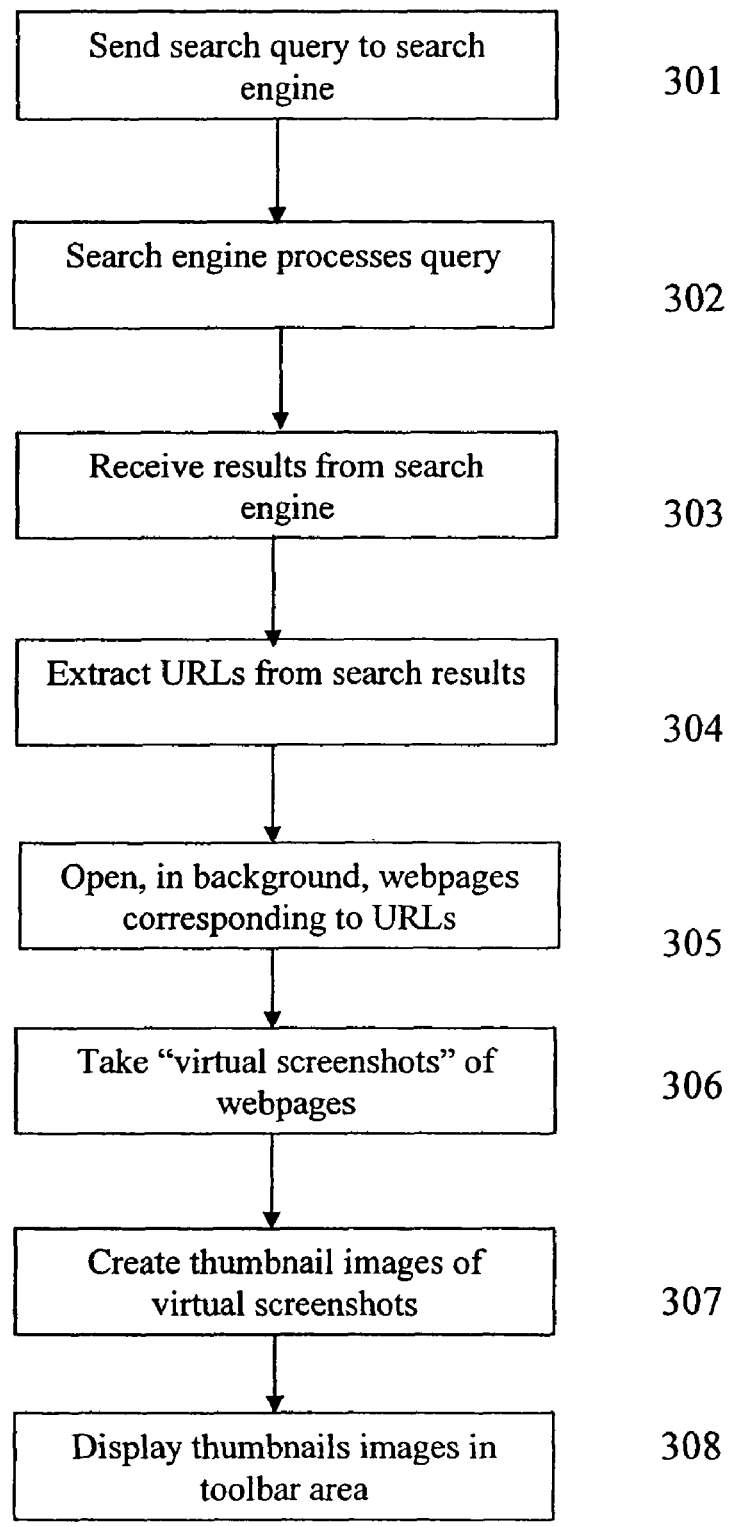
FIG. 3 illustrates one possible embodiment of a method of the present invention for visually displaying search results.

According to one embodiment of the present invention, a search toolbar implemented according to the present invention is installed with Microsoft's Internet Explorer® browser on a user's computer 205. The search toolbar includes an interface which allows a user to enter a search query (e.g., by typing keywords into a text box) and send the query to a search engine (e.g., by clicking on a button). As shown in FIG. 3, when the user enters a query and initiates a search, e.g., by clicking a "search" icon, the toolbar sends the query from the user's computer 205 through the network 201 to a search engine server 202 (e.g., a Yahoo! Search server) (Step 301). The search engine server processes the search query (step 302) and sends the search results back through the network 201 to the toolbar on the user's computer 205 (step 303). The search results should include a listing of URLs to webpages which relate to the user's search query (e.g., webpages located on servers 203 and 204) and the results may be in any format which can be interpreted by the toolbar (e.g., HTML (HyperText Markup Language), XML (eXtensible Markup Language), plain text, etc.). The toolbar may then process the search results to extract URLs pointing to webpages on servers 203 and 204 (step 304), and open the webpages on servers 203 and 204 in Internet Explorer windows which are maintained in the background (e.g., the windows are not displayed on the user's screen but exist only in the memory of the user's computer) (step 305). When opened in browser windows in the background, the webpages are also stored in the cache on the user's computer. Alternatively, rather than opening a browser window in the background, the toolbar may use the HTML interpreter of the browser to "render" the webpage to a block of memory instead of the screen. In another alternative, the toolbar may include its own HTML interpreter to render the webpage. Using the background browser window or the webpage rendered to memory, the toolbar may then take "virtual screenshots" of each of the webpages (i.e., the toolbar creates images of what the webpage would look like if it were displayed in an actual window on the user's screen) (step 306), create a thumbnail image of each of the screenshots (step 307), and display the thumbnail images in the toolbar area of the user's browser window (step 308). The toolbar may also display the search results in a webpage in the main browser window. The user may then visually review the search results by viewing the thumbnails showing the current appearance of the webpages from the search results, and may load one of the webpages in the search results by clicking on its thumbnail. Optionally, because it may take some time for the toolbar on the client to generate thumbnails of the search results, the search engine server may send initial thumbnails with the search results to be displayed until the client-generated thumbnails have been created and can replace the server-provided thumbnails.

One advantage of this embodiment of the present invention is that because the thumbnail creation process occurs on the client, all of the webpages in the search results are downloaded to the client in order to create the thumbnails, and the contents of the webpages (e.g., the HTML code, images, etc.) are stored in the user's (e.g., the browser's) cache. Thus, when the user clicks on one of the thumbnails, the webpage appears almost instantly because it needs only to be loaded from the browser's cache. Another advantage to performing thumbnail creation on the client-side is that the client's (i.e., the user's) processor time and network bandwidth are expended, not the search engine provider's. A further advantage is that if a link in the search results is "broken" (for example, the server that hosts the webpage is not responding), the toolbar may display an icon indicating to the user that the webpage is not currently available.

Figure 4:
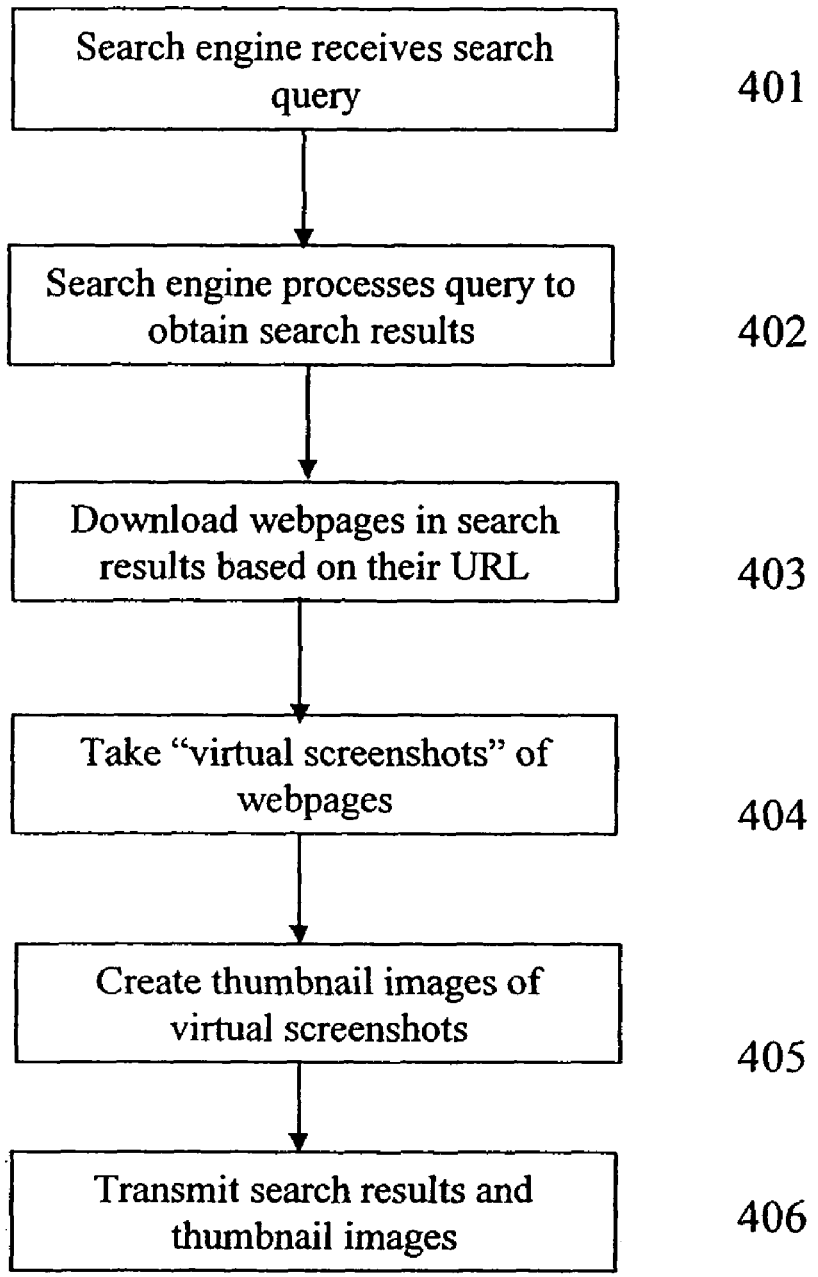
FIG. 4 illustrates one possible embodiment of a method of the present invention for visually displaying search results.

According to another possible embodiment of the present invention, the thumbnailing of the webpages may occur at the search engine server when the user's search query is processed, although the processor load and network traffic for the search engine server may be significantly increased as compared to the embodiment discussed above where the thumbnail creation is performed on the client-side. As shown in FIG. 4, when the search engine server receives a search query (step 401), it processes the search query (step 402) to obtain the search results including a list of URLs relating to the user's search query, downloads each of the webpages based on their URLs (step 403), takes a "virtual screenshot" of the current appearance of each of the webpages (step 404), creates a thumbnail image of each of the screenshots (step 405), and transmits the search results and thumbnails to the user's computer (step 406). The user's browser may then display the search results along with the thumbnails.

Figure 16:
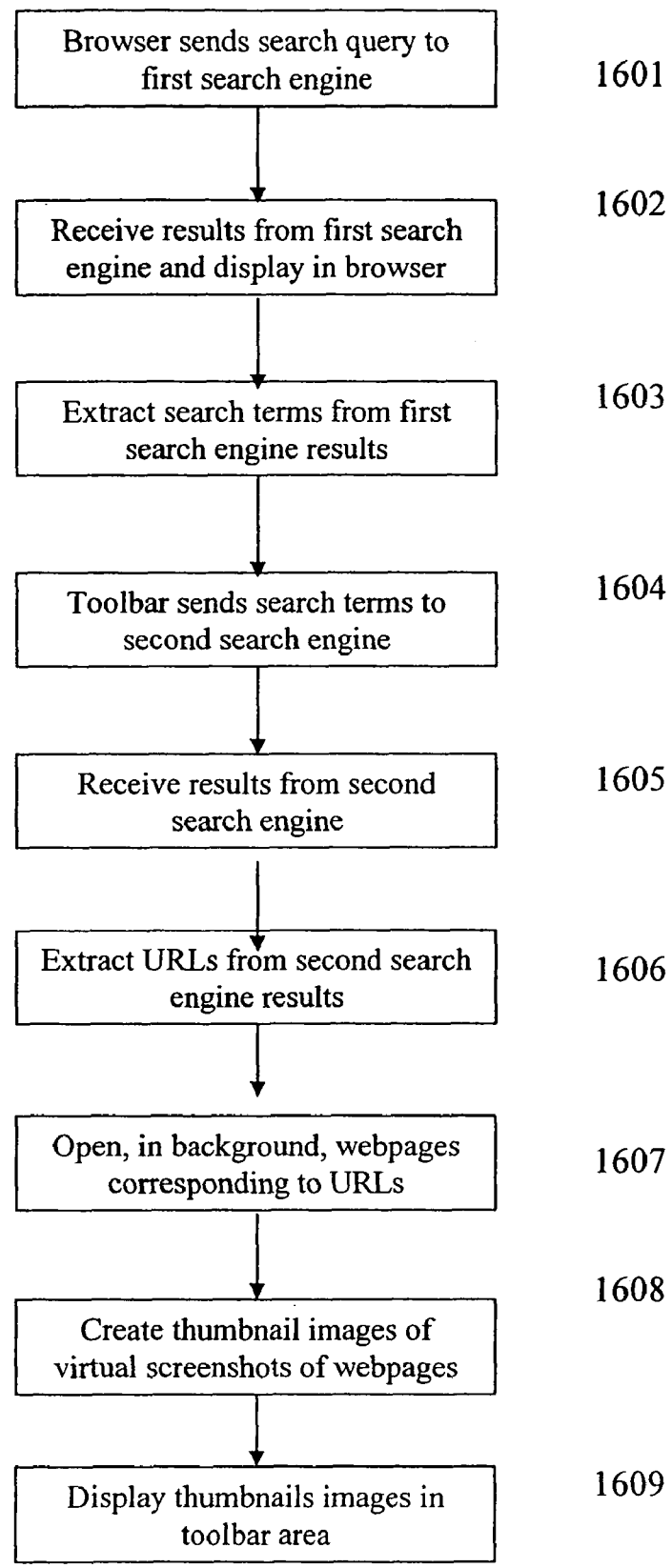
FIG. 16 illustrates one possible embodiment of a method of the present invention for visually displaying comparative search results.

According to another embodiment of the present invention, a search toolbar implemented according to the present invention may provide comparative search results. As shown in FIG. 16, when the user navigates to the web page of a first search engine, enters a query and initiates a search, the browser sends the query to a first search engine (step 1601). The first search engine processes the search query and the browser receives and displays the webpage containing the search results in the browser (step 1602). By analyzing the search results webpage or the URL of the search results webpage, the toolbar may activate its comparative search features. The toolbar then analyzes the search results received from the first search engine to determine what search terms were used to generate the results by, for example, using the browser's API functions to acquire the URL of the search results webpage and determining the search terms entered by the user from that URL (step 1603). Alternatively, the toolbar may be able to determine the search terms by using the browser's API functions to acquire and analyze the content of the search results webpage or the search query that was sent to the first search engine by the browser. The toolbar then sends a search query using the extracted search terms to a second search engine (step 1604). When the toolbar receives the results from the second search engine (step 1605), it extracts the URLs of the webpages listed in the results (step 1606), and opens these webpages in the background (step 1607). The toolbar may create thumbnail images of "virtual screenshots" of each of the webpages (step 1608) and display the thumbnail images in the toolbar area of the user's browser window (step 1609). The user may then compare the results from the first search engine (displayed in the browser window) with the search results from the second search engine (displayed in the toolbar).

Embodiments of the present invention may also include a number of other features. For example, the search results may be received from the search engine server in two sets (e.g., two XML feeds), one feed for sponsored links and one feed for the normal search results. These two feeds may then be processed simultaneously and the resulting thumbnails be displayed as soon as they can be loaded and processed (e.g., the results may not be displayed in the order they were in the original feeds). Alternatively, the toolbar may process and display the sponsored results first and the normal search results after the sponsored results have been completed, thus encouraging users to click on the sponsored results. In another alternative, the toolbar may display the sponsored results first proceeding from left to right, and preceding the display of the normal search results, thus encouraging users to click on the sponsored results. In this case, placeholder icons may initially appear in the toolbar in place of the thumbnails. As the thumbnails are created the placeholder icons are gradually replaced, typically from left to right, by the thumbnails of the search results and the user is more likely to click on the results which appear starting at the left, e.g., the sponsored results. The toolbar may also be configured to only initially process enough of the webpages from the search results to fill the available display area in the toolbar. An interface may then be provided which allows the user to scroll the thumbnails left or right (e.g., using buttons or a scroll bar) and as additional thumbnails can fit in the toolbar area, those webpages are processed and thumbnails created for them. The thumbnail images created for displaying the search results may be maintained in memory after the user has navigated away from the search results and only discarded when the browser session is ended or when the memory being used for thumbnail storage reaches some threshold value.

Embodiments of the present invention may also include the ability to download updates in order to keep their functionality current. For example, an embodiment with comparative search capability may periodically download additional data and code which allows it to determine which search engines and URLs are to be recognized for activating the comparative search and instructions on how to analyze search results from those search engines in order to extract the search terms which were used to execute the search query.

Figure 18:
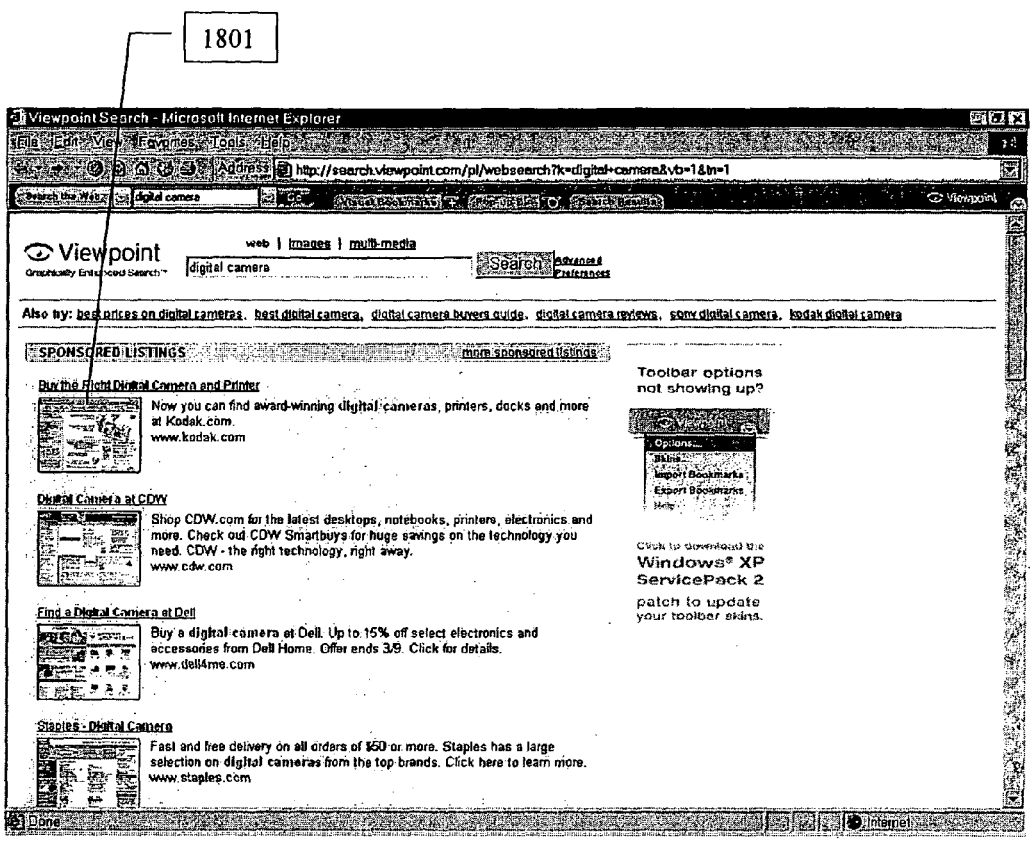
FIG. 18 illustrates an example of the possible appearance of search results displayed in accordance with one possible embodiment of a method of the present invention for visually displaying search results.

Another optional feature of embodiments of the present invention is displaying the thumbnail images directly in the search results, instead of, or in addition to, displaying the thumbnails in the toolbar. FIG. 18 shows an embodiment where the thumbnails (e.g., 1801) are shown in the search results. When the search results are initially received from the search engine they may contain server-generated thumbnail images of the webpages in the search results or simply a placeholder in the HTML code of the webpage. These server thumbnails or placeholders may then be replaced by client-generated thumbnails. This may be accomplished by dynamically inserting some HTML into the currently loaded webpage using the browser's API. The inserted HTML may contain an <img> tag that specifies a local image file that is temporarily created for each thumbnail. The browser API may then be used to refresh or update the thumbnail using the <img> tag. To avoid a conflict from the browser reading the thumbnail image as it is being generated or updated, new temporary image files may be created each time. The temporary image files may be deleted after the user navigates away from the search result page, the user closes the browser, or some other condition is met that indicates it is safe to delete the temporary file.

Figure 19:
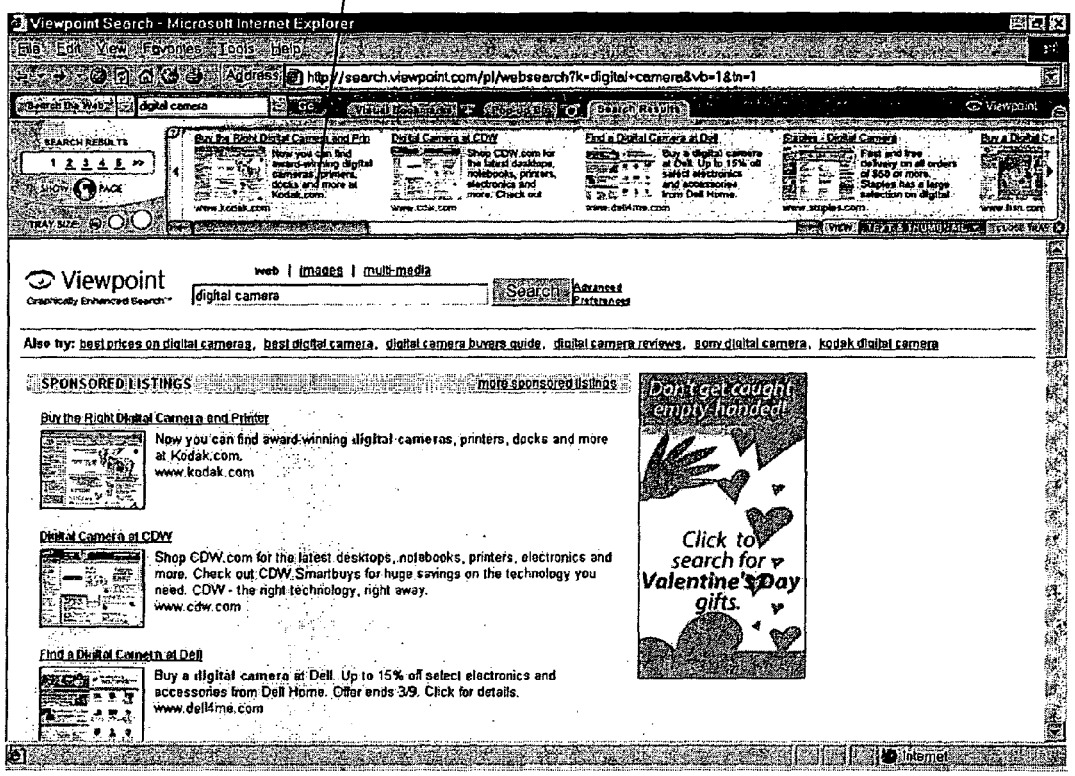
FIG. 19 illustrates another example of the possible appearance of search results in accordance with a possible embodiment of a method of the present invention for visually displaying search results.

Another optional feature of embodiments of the present invention is displaying text relating to the webpage alongside the thumbnail of the webpage in the toolbar. FIG. 19 shows an example of such a display where text (e.g., 1901) is shown alongside the thumbnail image of the webpage. The text could be extracted directly from the webpage by the client or could be provided by the search engine (e.g., the text could be extracted from the search results webpage). Optionally, just the extracted text may be shown.

Figure 5:
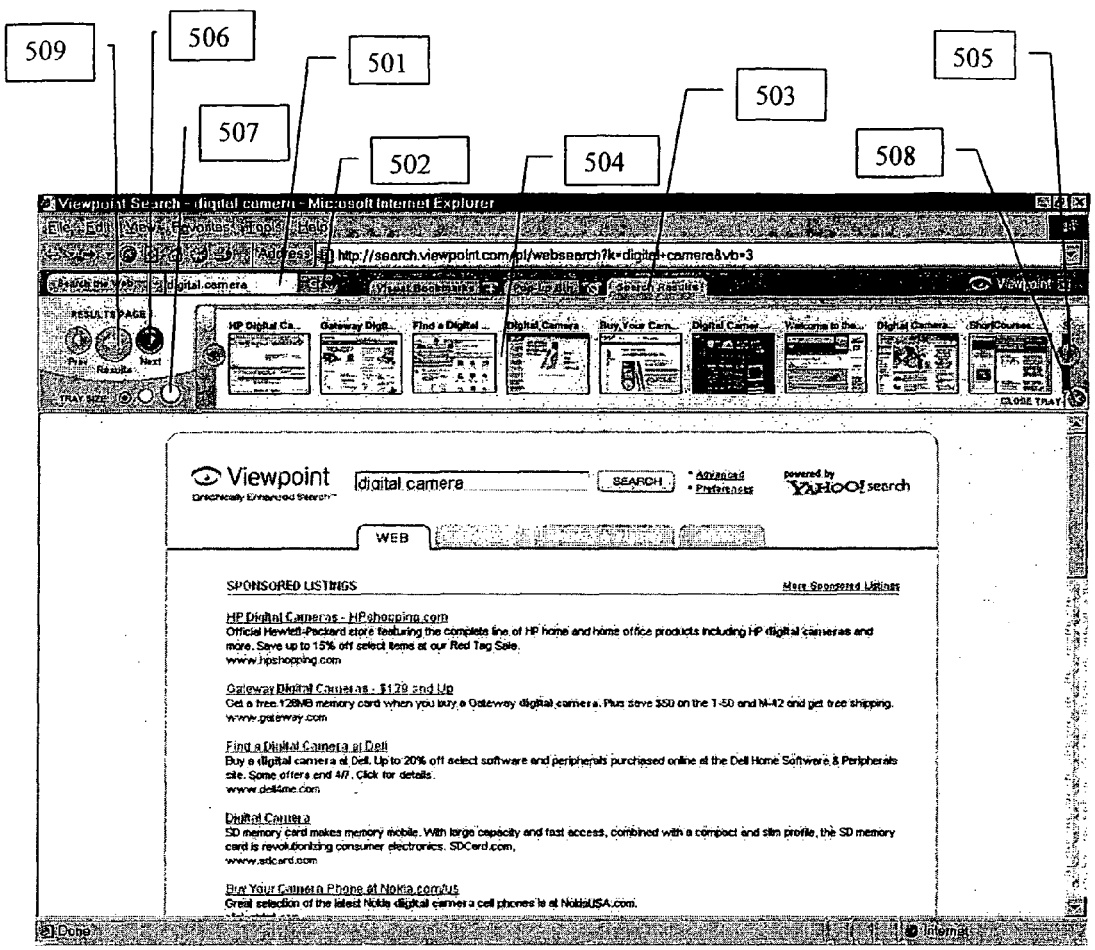
FIG. 5 illustrates an example of the possible appearance of an interface for search results displayed in accordance with one possible embodiment of a method of the present invention for visually displaying search results.
Figure 6:
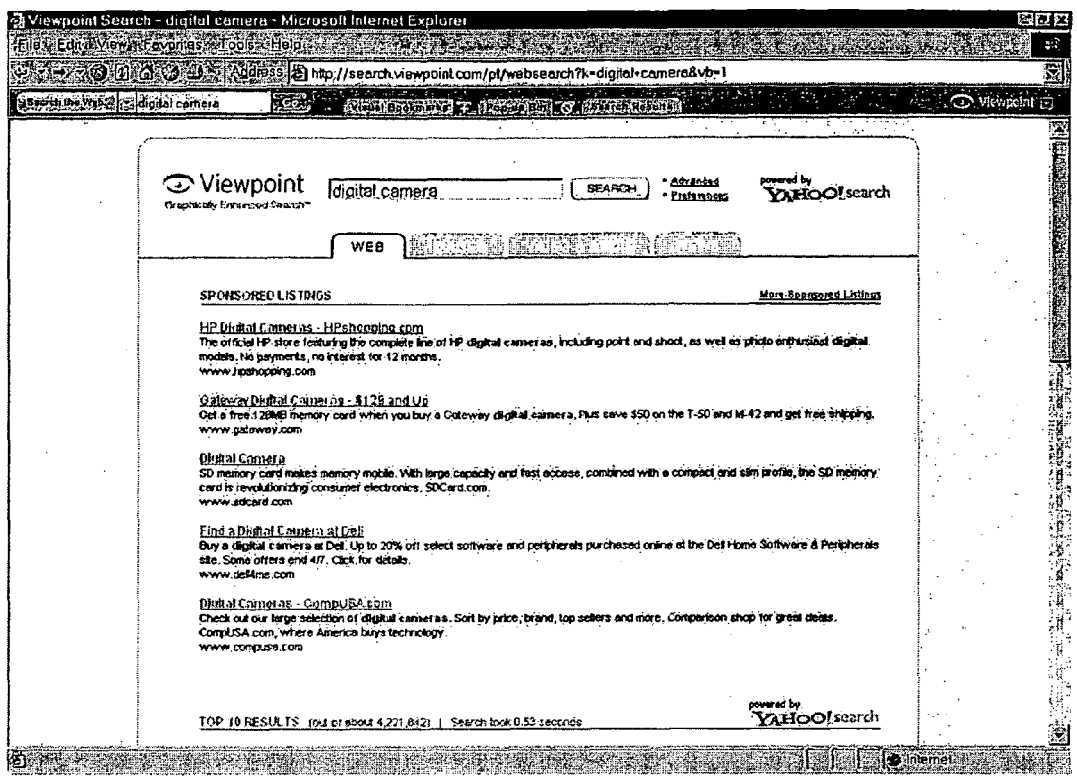
FIG. 6 illustrates an example of the possible appearance of an interface for search results displayed in accordance with one possible embodiment of a method of the present invention for visually displaying search results.
Figure 7:
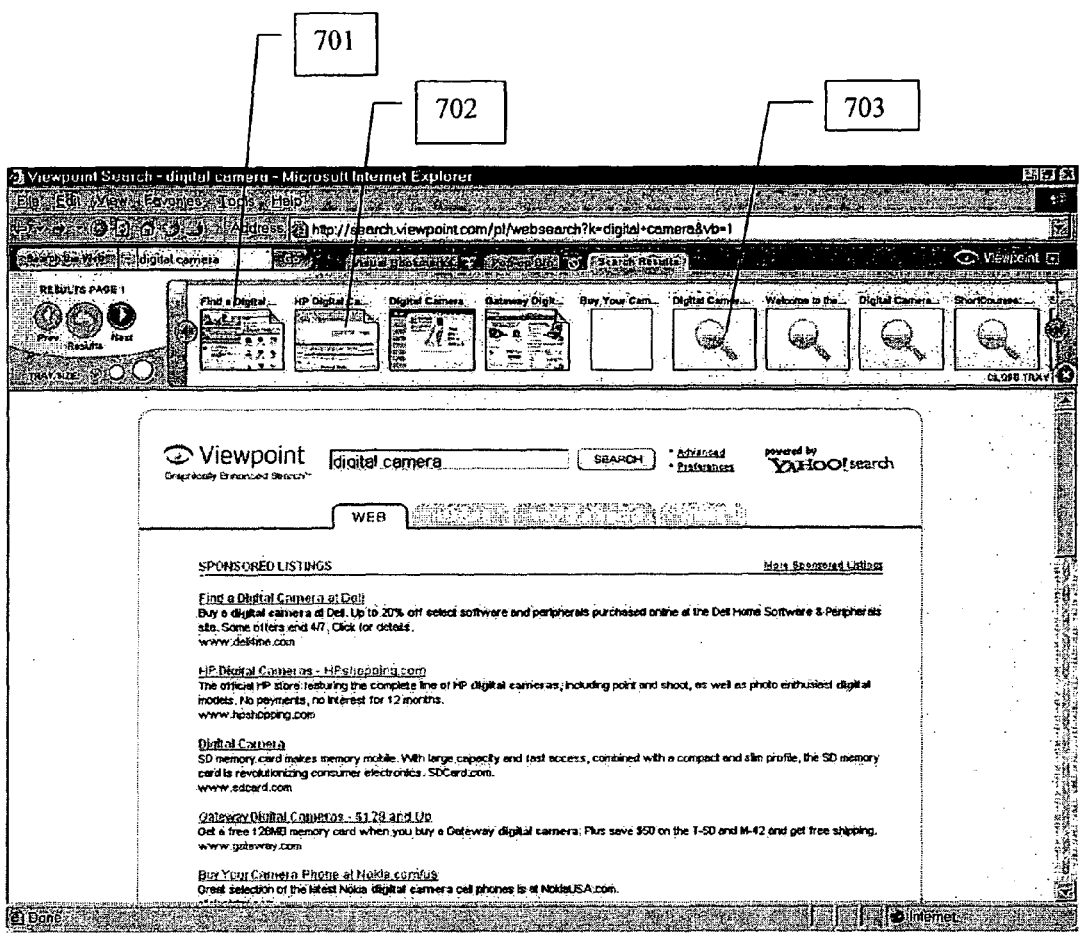
FIG. 7 illustrates an example of the possible appearance of an interface for search results displayed in accordance with one possible embodiment of a method of the present invention for visually displaying search results.
Figure 17:
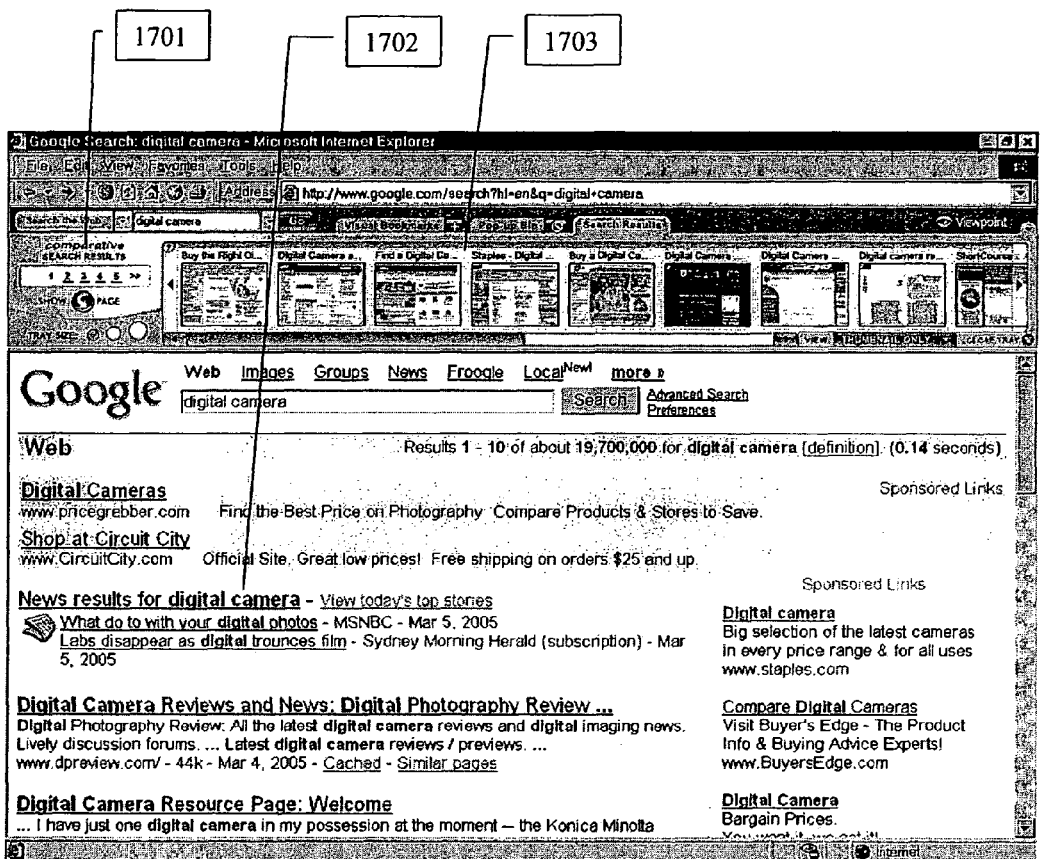
FIG. 17 illustrates an example of the possible appearance of an interface for comparative search results displayed in accordance with one possible embodiment of a method of the present invention for visually displaying comparative search results.

An example of the possible appearance of the interface for a toolbar implemented according to the present invention is shown in FIG. 5. The upper part of the interface includes an area for entering the search query (501), a button for directing the toolbar to send the search query to the search engine server (502), and a tab interface for changing between the search results and the other functions implemented in the toolbar (503). The lower portion of the interface includes an area for displaying the thumbnail images of the search results (504), buttons for scrolling left and right in the search results (505), buttons for going to the next or previous entire webpage of search results (506), buttons for increasing and decreasing the height of the lower portion of the interface (507), and a button for collapsing the lower portion of the interface (508). FIG. 6 shows the toolbar collapsed so that only the upper part of the interface appears on the screen. The lower portion may reappear when one of the tabs is clicked or a new search is run. FIG. 7 shows the toolbar when only some of the thumbnails have appeared (e.g., 701, 702) and the thumbnails still being created are represented by placeholder icons (e.g., 703). FIG. 17 shows the toolbar displaying the results of a comparative search (e.g., 1701). The search results from the first search engine are displayed in the browser window (e.g., 1702) and the search results from the second search engine are displayed as thumbnails in the toolbar area (e.g., 1703).

The toolbar may also maintain the search results even after the user has navigated to one of the webpages in the search results. If a user then clicks on another of the thumbnails in the search results, the toolbar will take the user directly to that webpage without the user needing to return to the webpage containing the textual representation of the search results. The toolbar may also include an interface (e.g., button 509) which, with a single click, may restore the webpage containing the textual representation of the search results no matter how many webpages past the initial results the user has navigated.

Figure 8:
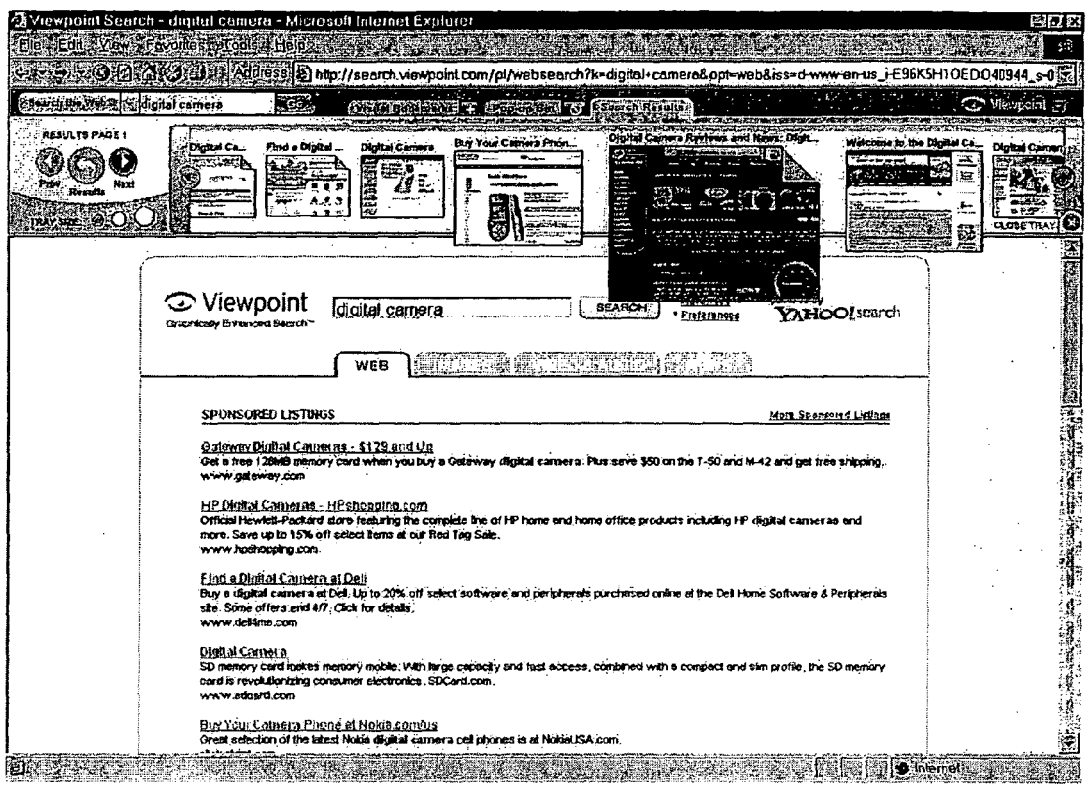
FIG. 8 illustrates an example of the possible appearance of search results displayed in accordance with one possible embodiment of a method of the present invention for visually displaying search results.

The toolbar may also provide the user with the option of marking certain search results so that the user can easily reference them later or simply to indicate that the user has already visited them. For example, the toolbar interface may allow each thumbnail to be marked by a "virtual dogear" as if the thumbnail was a physical document with the corner folded over (e.g., see FIG. 8). When a user moves the cursor over a thumbnail, a grayed corner indicator may appear on the thumbnail that when clicked appears to fold over the corner of the thumbnail. Data which identifies the dogeared thumbnails (e.g, the URL of the thumbnailed webpage or a keyword and page title) may then be stored on the user's computer, for example in a database, and when that webpage is thumbnailed again in the future, the toolbar may mark it with a virtual dogear. Optionally, the data on dogeared pages may only be maintained for a certain number of dogears or may only be maintained for a single browser session. The toolbar may also allow a user to choose to display only dogeared thumbnails or to display dogeared thumbnails in a separate toolbar "tray."

Typically, search results received from a search engine server contain direct hyperlinks to the webpages which were provided in response to the user's query. These direct hyperlinks may be used to directly access the referenced webpages and create the thumbnail images for display. However, occasionally the search results received by the toolbar from a search engine server may not be able to be processed to determine the precise webpage that the search result came from. This may result when the URL in the search results is a redirect link which points back to the search engine server (e.g., so that the search engine may log that a sponsored link has been clicked on) and the full URL may be encoded in some fashion. In such situations, the toolbar may attempt to process the search results to extract as much of the URL as possible, for example, by extracting the domain name of the website that particular webpage of the search results is on. The main or root webpage of that site then may be displayed as the thumbnail image. If the user clicks on such a thumbnail, the toolbar may follow the redirect link through the search engine server to reach the intended page, and update the thumbnail image when the webpage loads in the user's main browser window. Alternatively, the toolbar may query the search engine server for more information so that it can properly resolve the URL for the search result.

Figure 9:
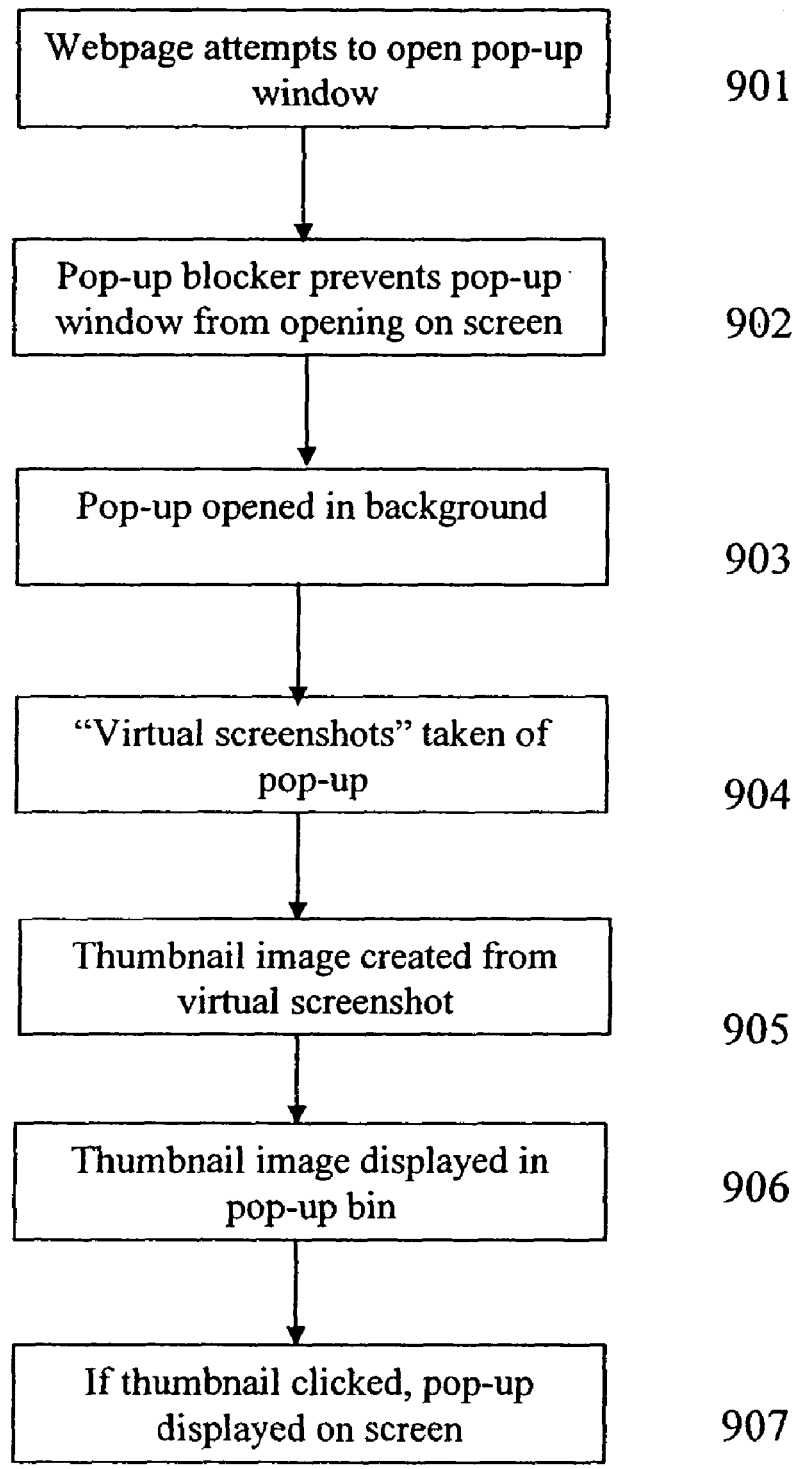
FIG. 9 illustrates one possible embodiment of a method of the present invention for visually displaying webpages that have been blocked from appearing on a screen.

According to another possible embodiment of the present invention, a pop-up blocker implemented according to the present invention is installed with Microsoft's Internet Explorer® browser on a user's computer 205. As shown in FIG. 9, when a user navigates to a webpage stored on server 203, code on the webpage attempts to open a pop-up window from server 204 (step 901). The pop-up blocker of the present invention may prevent the pop-up from opening on the screen of the user's computer 205 (step 902) and instead open the pop-up in a browser window running in the background (step 903). Optionally, the pop-up blocker may provide the user with a visual and/or audio cue that a pop-up has been blocked (e.g., the pop-up window could be briefly displayed). A virtual screenshot may then be taken of the pop-up window (step 904), a thumbnail image may be created from the virtual screenshot (step 905), and the thumbnail may be displayed in a "pop-up bin" in the browser's toolbar area (step 906). If the user then clicks on the thumbnail of the pop-up (for example, if the user is interested in the content of the pop-up), the pop-up window can be displayed on the user's screen (e.g., by bringing the browser window where the pop-up was opened from the background to the foreground) (step 907) and optionally removed from the pop-up bin.

Blocked pop-up windows may be held in the pop-up bin, for example, until the user directs that they be removed (e.g., by clicking an "Empty Bin" button), until a predetermined or user-selected number of pop-ups have been blocked (e.g., after five pop-ups have been blocked, when a sixth is blocked the first is removed so that no more than five pop-ups are in the bin at once), until the webpage which generated the pop-up has been navigated away from, or until the end of the browsing session.

Figure 10:
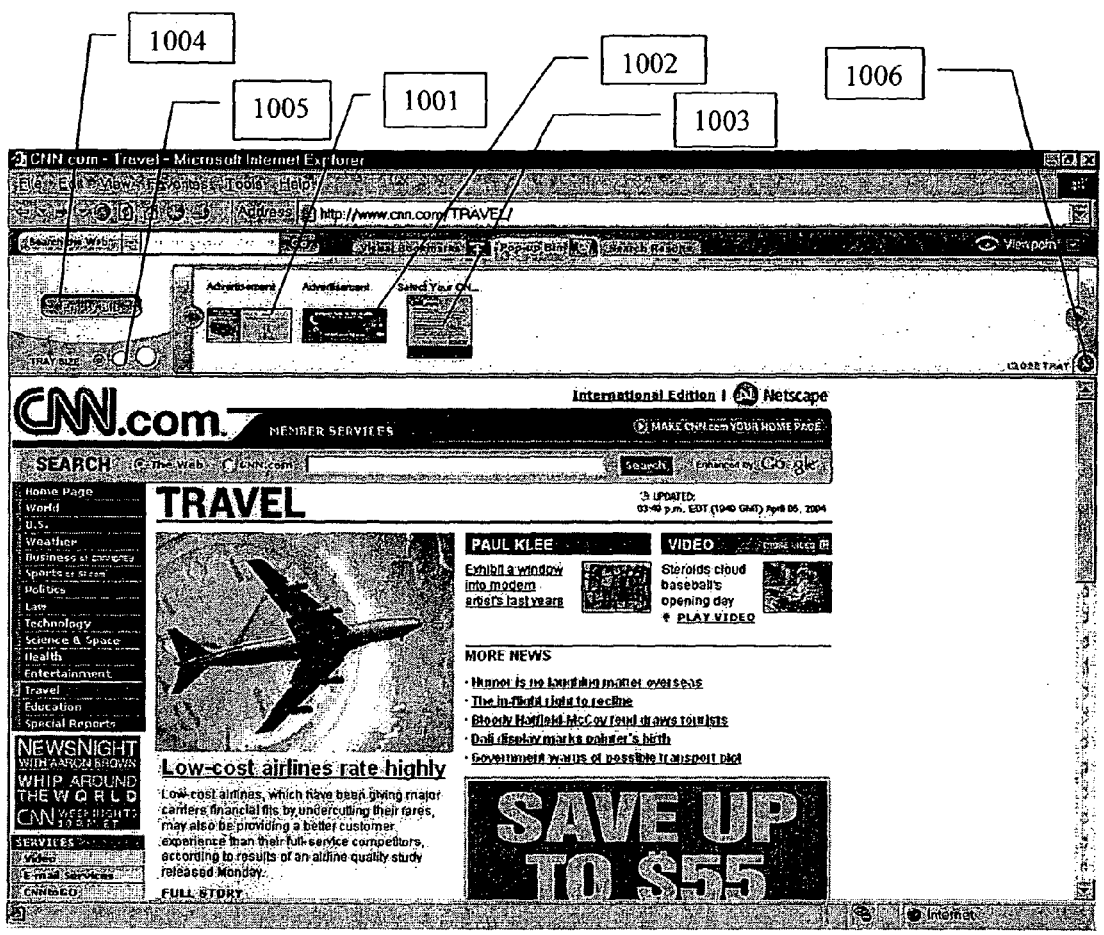
FIG. 10 illustrates an example of the possible appearance of an interface for visually displaying webpages that have been blocked from appearing on a screen in accordance with one possible embodiment of a method of the present invention.
Figure 11:
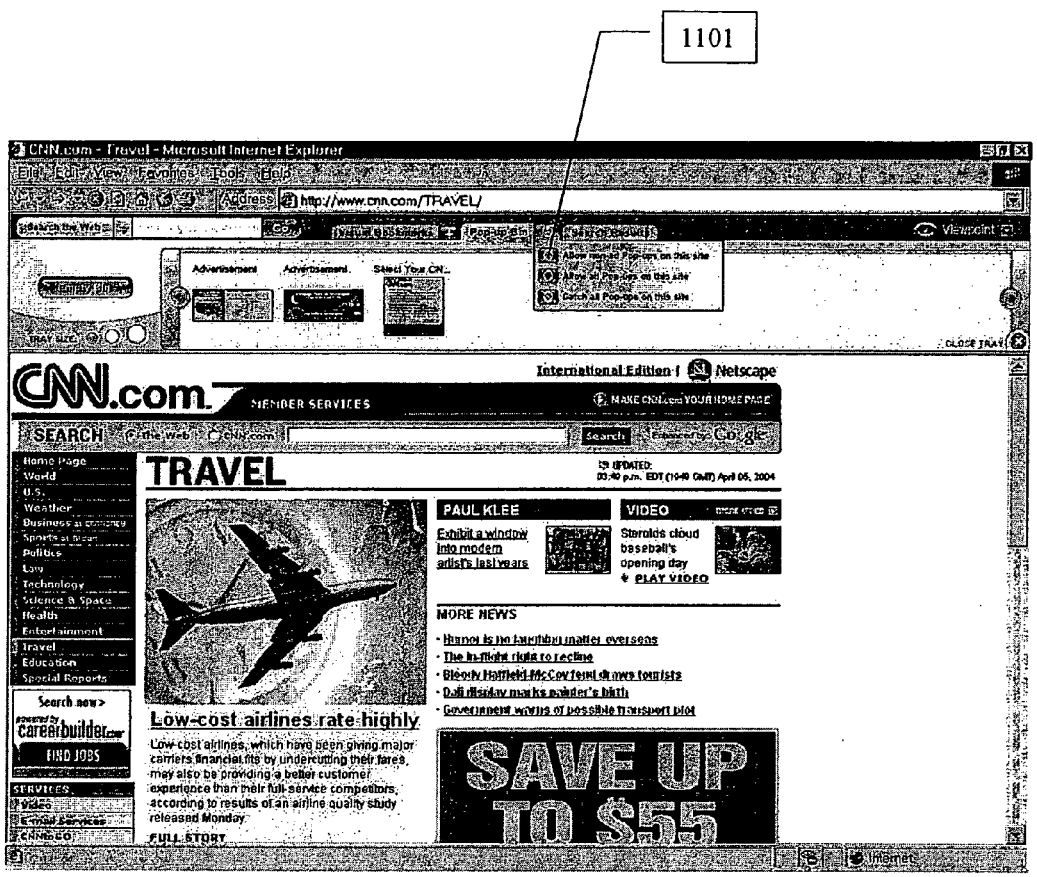
FIG. 11 illustrates an example of the possible appearance of an interface for visually displaying webpages that have been blocked from appearing on a screen in accordance with one possible embodiment of a method of the present invention.

An example of such a pop-up bin and its interface is shown in FIG. 10. Thumbnail images 1001, 1002 and 1003 show pop-up windows which have been prevented from appearing on the user's screen. Also shown is a button 1004 for directing the toolbar to remove the thumbnails from the pop-up bin, buttons for increasing and decreasing the height of the lower portion of the interface (1005), and a button for collapsing the lower portion of the interface (1006). The pop-up blocker may also provide an interface for the user to identify to the pop-up blocker what kinds of pop-ups to block. For example, the pop-up blocker may be configured to block all pop-ups, block only those pop-ups which are advertisements, or block no pop-ups. The toolbar may distinguish between advertisement pop-ups and other pop-ups based on where the pop-up window is being downloaded from because advertisement pop-ups are likely to be downloaded from a website of a different domain than the webpage currently being display on the user's browser. An example of such an interface is shown in FIG. 11 (1101). Furthermore because a pop-up blocker implemented in accordance with the present invention may load the pop-up in the background, the pop-up may be controlled based on its actual URL, rather then based on the URL of the originating website or on a redirecting URL which does not indicate the actual URL of the pop-up.

Figure 12:
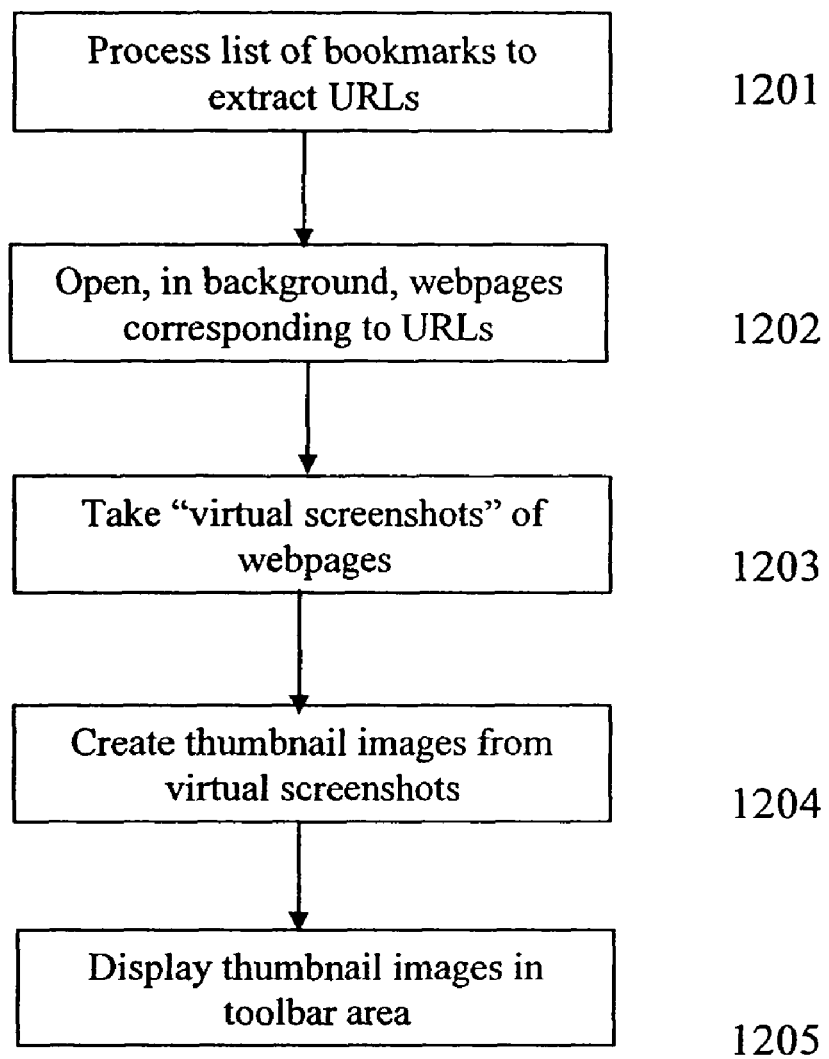
FIG. 12 illustrates one possible embodiment of a method of the present invention for visually displaying a list of bookmarked or favorite webpages.

According to another possible embodiment of the present invention, a visual bookmark display implemented according to the present invention is installed with Microsoft's Internet Explorer® browser on a user's computer 205. As shown in FIG. 12, a user's list of bookmarked or favorite websites may be processed to extract the URLs for each of the webpages (step 1201), each webpage may be opened in a browser window in the background (step 1202). A virtual screenshot may then be taken of the current appearance of the bookmarked webpage (step 1203), a thumbnail image may be created from the virtual screenshot (step 1204), and the thumbnail may be displayed in the browser's toolbar area (step 1205). The user may then navigate to the bookmarked webpage by clicking on the thumbnail.

Alternatively, the visual bookmark for each webpage may be initially created the first time the user navigates to the bookmarked webpage with the visual bookmarks feature activated. The thumbnails for each bookmark also may be periodically updated in a variety of ways. For example, all of the bookmarks may be updated each time the user starts the browser application, all of the bookmarks may be updated at some periodic interval which may be configured by the user (for example, once a week, once a day, every fifth time the browser is launched, etc.), or each bookmark may be updated only when the user visits the bookmarked webpage. The visual bookmarks may also be configured to provide an indication to the user that the thumbnail has changed since the last time the user visited the webpage by, for example, highlighting or framing the thumbnail. In order to protect user's confidential information, a thumbnail of a secure website (for example one accessed using the HTTPS protocol) may be obscured in some way by, for example, blurring the thumbnail or replacing or overlaying it with an icon of a padlock.

Optionally, a visual bookmark may also be created when a URL is dragged from a webpage, the desktop or some other source, and dropped onto the visual bookmarks toolbar tray. The toolbar would then create a visual bookmark for the URL and display it in the tray. Visual bookmarks may also optionally be dragged from the visual bookmarks toolbar and dropped into an email or word processing document as the URL corresponding to the visual bookmark.

Figure 13:
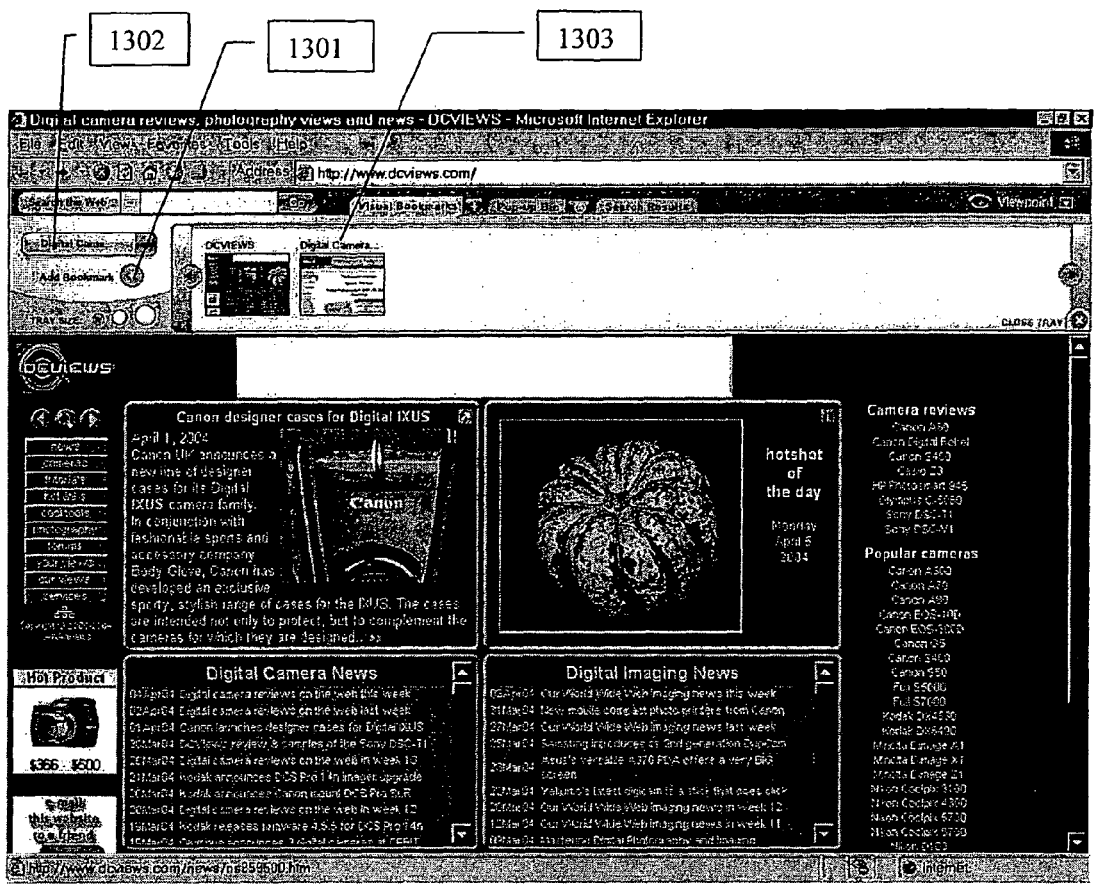
FIG. 13 illustrates an example of the possible appearance of an interface for visually displaying a list of bookmarked or favorite webpages in accordance with one possible embodiment of a method of the present invention.

An example of such a visual bookmark toolbar and its interface is shown in FIG. 13. Such an interface may include buttons for adding additional bookmarks (1301), changing between different lists or subsets of the user's bookmarks (1302), and an area for displaying the visual bookmarks (i.e., the thumbnails) (1303).

Figure 14:
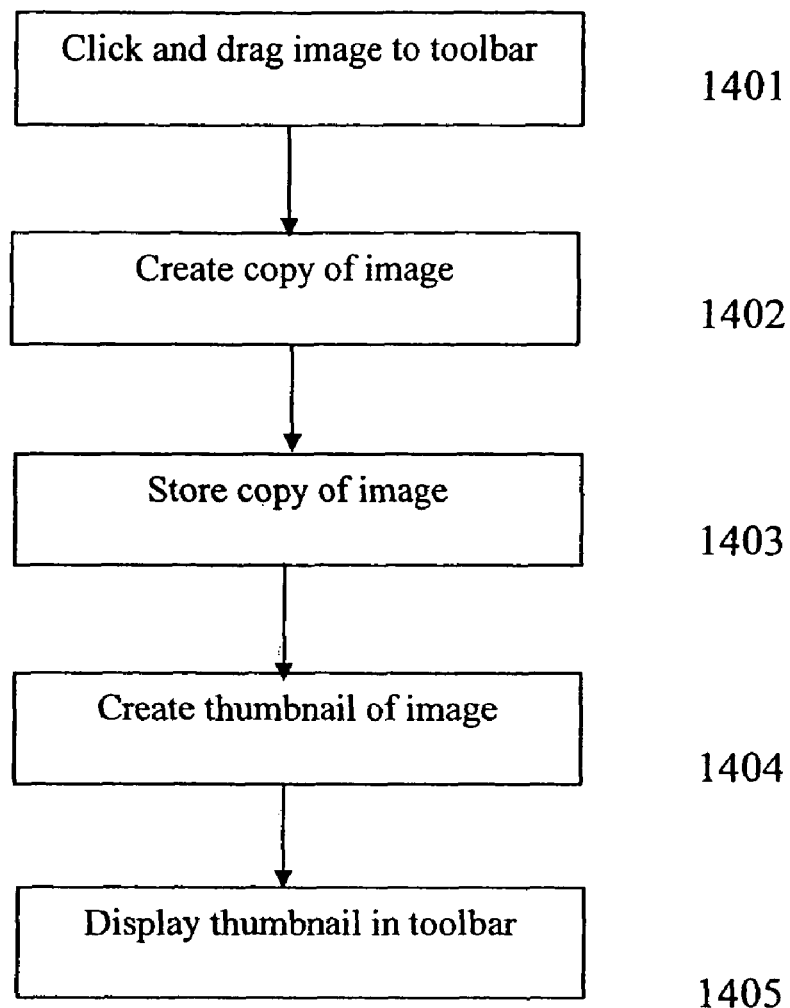
FIG. 14 illustrates one possible embodiment of a method of the present invention for visually displaying images which have been extracted from webpages and stored.

According to another possible embodiment of the present invention, an image storage toolbar implemented according to the present invention is installed with Microsoft's Internet Explorer®browser on a user's computer 205. As shown in FIG. 14, when a webpage including images is displayed to the user, the user may click on an image and drag it to the image storage toolbar (step 1401), the image storage toolbar may then create a copy of the image (step 1402), store the copy of the image in a location on the user's computer (step 1403), create a thumbnail of the image (step 1404) and display the thumbnail in the image storage toolbar (step 1405). The user may then click on the thumbnail of the image in the toolbar in order to manipulate the image (e.g., save the image to a file on the user's hard drive, email the image to another user, etc.).

Figure 15:
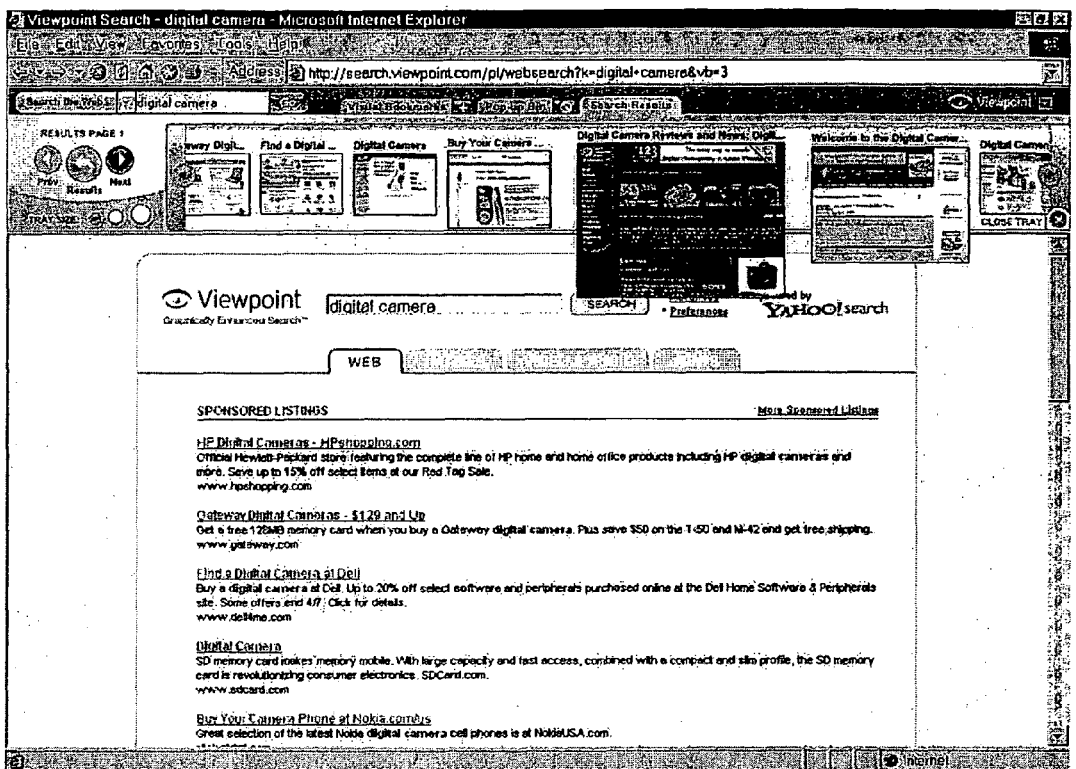
FIG. 15 illustrates an example of the possible appearance of thumbnail images displayed in accordance with various embodiments of the present invention.

A "thumbnail image" or "thumbnail" as used in conjunction with embodiments of the present invention is an image of a size that is convenient to display in the area of the toolbar. Such images may be created by reducing the resolution of the source image to match the desired resolution of the thumbnail. The thumbnail images may match the aspect ratio of the source image or they may be forced to a desired aspect ratio by stretching or cropping the source image as necessary to fit the desired aspect ratio. The thumbnail images may also be selectively cropped from the source image with no reduction in resolution. In some cases the source images may already be of such a size that they do not require a reduction in resolution to reach the desired thumbnail size. In such cases the source image may be used as the thumbnail image. Embodiments of the present invention may also allow thumbnails to be created and/or displayed at a variety of resolutions based on preferences selected by the user. For example, thumbnails could be captured at a higher resolution than the resolution at which they are initially displayed to the user and when the user's cursor is located above the thumbnail (frequently referred to as "mouse over"), the thumbnail is expanded to its full resolution (e.g., see FIG. 15). This expansion can be accomplished smoothly by, for example, capturing the thumbnail at a higher resolution, creating one or more copies of the thumbnail at lower resolutions and interpolating between the various copies to expand the thumbnail when the mouse over occurs.

The present invention is not limited to the specific embodiments described. It is expected that those skilled in the art will be able to devise other implementations that embody the principles of the present invention and remain within its scope.

What is claimed is:

1. A method for visually displaying search results comprising:

receiving, by a processor from a first search engine, first search result data;

determining, by the processor, search query information from said first search result data;

transmitting said search query information to a second search engine;

receiving, from said second search engine, second search result data identifying a plurality of webpages;

determining network address information for a webpage of said plurality of webpages from the second search result data;

retrieving, at a first location, said webpage using said network address information determined from the second search result data;

creating, at said first location, a reduced size representation of said webpage as it would currently appear if presently displayed; and displaying, at said first location, said representation of said webpage from the second search result data and said first search result data.

2. The method of claim 1 wherein said representation is displayed in a browser window with said first search result data.

3. The method of claim 1 wherein said representation is displayed separately from said first search result data.

4. The method of claim 3 wherein said representation is displayed in a browser toolbar.

5. The method of claim 1 further comprising:

displaying a placeholder image for said representation of said webpage; and replacing said placeholder image with said representation of said webpage after completion of said creating step.

6. The method of claim 5 wherein said placeholder image is an image of said webpage that was received with said second search result data.

7. The method of claim 5, wherein the placeholder image is a server-generated thumbnail image, which is a reduced-sized presentation of the first webpage from an indeterminate point in the past.

8. The method of claim 1 further comprising:
detecting a selection of said representation of said webpage; and navigating to said webpage.

9. The method of claim 1, further comprising:
in response to receiving the first search result data from the first search engine, executing comparative search instructions for analyzing the first search result data from the first search engine to determine the search query information.

10. The method of claim 1, wherein the determining network address information comprises:
in response to a determination that a uniform resource locator for the webpage is a redirect link, displaying a root webpage as the reduced sized presentation of the webpage.

11. The method of claim 1, further comprising:
when code from the webpage attempts to open a pop-up window, creating a reduced sized representation of the pop-up window; and
displaying the reduced sized representation of the pop-up window in a tool bar of a browser.

12. The method of claim 1, further comprising:
opening a browser application prior to receiving first search data;
generating reduced sized representations of booked marked webpages upon navigation to the bookmarked webpage; and
periodically updating the reduced sized representation of the booked marked webpage.

13. An article of manufacture comprising a computer-readable medium having stored thereon instructions adapted to be executed by a processor, the instructions which, when executed, define a series of steps to be used to visually display search results, said steps comprising:
receiving, from a first search engine, first search result data;
determining search query information from said first search result data;
transmitting said search query information to a second search engine;
receiving, from said second search engine, second search result data identifying a plurality of webpages;
determining network address information for a webpage of said plurality of webpages from the second search result data;
retrieving, at a first location, said webpage using said network address information determined from the second search result data;
creating, at said first location, a reduced size representation of how said webpage as it would currently appear if presently displayed; and
displaying, at said first location, said representation of said webpage and said first search result data.

14. The article of manufacture of claim 13 wherein said representation is displayed in a browser window with said first search result data.

15. The article of manufacture of claim 13 wherein said representation is displayed separately from said first search result data.

16. The article of manufacture of claim 13 wherein said representation is displayed in a browser toolbar.

17. The article of manufacture of claim 13 further comprising the steps of:
displaying a placeholder image for said representation of said webpage; and
replacing said placeholder image with said representation of said webpage after completion of said creating step.

18. The article of manufacture of claim 17 wherein said placeholder image is an image of said webpage that was received with said second search result data.

19. The article of manufacture of claim 17, wherein the placeholder image is a server-generated thumbnail image, which is a reduced-sized presentation of the first webpage from an indeterminate point in the past.

20. The article of manufacture of claim 13 further comprising the steps of:
detecting a selection of said representation of said webpage; and
navigating to said webpage.

21. The article of manufacture of claim 13, further comprising:
in response to receiving the first search result data from the first search engine, executing comparative search instructions for analyzing the first search result data from the first search engine to determine the search query information.

22. The article of manufacture of claim 13, wherein the determining network address information comprises:
in response to a determination that a uniform resource locator for the webpage is a redirect link, displaying a root webpage as the reduced sized presentation of the webpage.

23. The article of manufacture of claim 13, said steps further comprising:
when code from the webpage attempts to open a pop-up window, creating a reduced sized representation of the pop-up window; and
displaying the reduced sized representation of the pop-up window in a tool bar of a browser.

24. The article of manufacture of claim 13, said steps further comprising:
opening a browser application prior to receiving first search data;
generating reduced sized representations of booked marked webpages upon navigation to the bookmarked webpage; and
periodically updating the reduced sized representation of the booked marked webpage.

* * * * *

UNITED STATES PATENT AND TRADEMARK OFFICE
CERTIFICATE OF CORRECTION

PATENT NO. : 8,041,701 B2
APPLICATION NO. : 11/329923
DATED : October 18, 2011
INVENTOR(S) : Jerry S. Amato et al.

Page 1 of 1

It is certified that error appears in the above-identified patent and that said Letters Patent is hereby corrected as shown below:

On the face of the patent, after paragraph (65) Prior Publication Data, please insert the following:

--Related U.S. Application Data

(60) Continuation of Application No. 11/122,156, filed on May 3, 2005, abandoned; which claims benefit of Provisional Application No. 60/568,550, filed on May 4, 2004.--

Signed and Sealed this
Third Day of January, 2012

David J. Kappos
*Director of the United States Patent and Trademark Office*